(12) United States Patent
Lasserre et al.

(10) Patent No.: US 12,190,550 B2
(45) Date of Patent: Jan. 7, 2025

(54) ANGULAR PRIORS FOR IMPROVED PREDICTION IN POINT-PREDICTIVE TREES

(71) Applicant: BlackBerry Limited, Waterloo (CA)

(72) Inventors: Sébastien Lasserre, Thorigné-fouillard (FR); Jonathan Taquet, Talensac (FR)

(73) Assignee: BlackBerry Limited, Waterloo (CA)

( * ) Notice: Subject to any disclaimer, the term of this patent is extended or adjusted under 35 U.S.C. 154(b) by 329 days.

(21) Appl. No.: 17/771,354

(22) PCT Filed: Oct. 31, 2019

(86) PCT No.: PCT/IB2019/001268
§ 371 (c)(1),
(2) Date: Apr. 22, 2022

(87) PCT Pub. No.: WO2021/084295
PCT Pub. Date: May 6, 2021

(65) Prior Publication Data
US 2022/0358686 A1  Nov. 10, 2022

(51) Int. Cl.
*G06K 9/00* (2022.01)
*G06T 9/40* (2006.01)

(52) U.S. Cl.
CPC ..................... *G06T 9/40* (2013.01)

(58) Field of Classification Search
CPC ...... H04N 19/61; H04N 19/105; H04N 19/91; H04N 19/13; H04N 19/50; H04N 19/96; G06T 9/00; G06T 2207/10028; G06T 17/00; G06T 2200/04; G06T 9/40; G06T 9/001; G06V 2201/12
See application file for complete search history.

(56) References Cited

U.S. PATENT DOCUMENTS

| 11,871,037 B2 | 1/2024 | Ramasubramonian et al. |
| 11,895,307 B2 * | 2/2024 | Mammou .................. G06T 9/40 |
| 11,941,855 B2 | 3/2024 | Ray et al. |
| 2011/0282581 A1 | 11/2011 | Zeng |

(Continued)

FOREIGN PATENT DOCUMENTS

| CN | 101032172 A | 9/2007 |
| CN | 106846425 A | 6/2017 |
| CN | 108769679 A | 11/2018 |

OTHER PUBLICATIONS

J.-K. Ahn, K.-Y. Lee, J.-Y. Sim and C.-S. Kim, "Large-Scale 3D Point Cloud Compression Using Adaptive Radial Distance Prediction in Hybrid Coordinate Domains," in IEEE Journal of Selected Topics in Signal Processing, vol. 9, No. 3, pp. 422-434, Apr. 2015, doi: 10.1109/JSTSP.2014.2370752. (Year: 2015).*

(Continued)

*Primary Examiner* — Utpal D Shah
*Assistant Examiner* — Kevin M Coomber
(74) *Attorney, Agent, or Firm* — Moffat & Co

(57) ABSTRACT

A method of encoding or decoding a point cloud for representing a three-dimensional location of an object, the point cloud being generated by a device comprising a plurality of beam emitters. The method comprises using information from the beam emitter such as the angle of each beam emitter, and the azimuthal distance between each point capture, to more efficiently represent the point cloud data.

19 Claims, 17 Drawing Sheets

(56) References Cited

U.S. PATENT DOCUMENTS

| | | |
|---|---|---|
| 2013/0235050 A1 | 9/2013 | Karras |
| 2016/0086353 A1 | 3/2016 | Lukac et al. |
| 2017/0214943 A1 | 7/2017 | Cohen et al. |
| 2017/0347100 A1 | 11/2017 | Chou et al. |
| 2019/0087979 A1 | 3/2019 | Mammou et al. |
| 2019/0156520 A1 | 5/2019 | Mammou et al. |
| 2019/0238853 A1* | 8/2019 | Galpin .................. H04N 19/52 |
| 2021/0327095 A1 | 10/2021 | Van Der Auwera et al. |
| 2021/0327098 A1 | 10/2021 | Ray et al. |
| 2021/0327099 A1 | 10/2021 | Van Der Auwera et al. |
| 2021/0407143 A1 | 12/2021 | Van Der Auwera et al. |
| 2021/0409778 A1 | 12/2021 | Ramasubramonian et al. |
| 2022/0337872 A1 | 10/2022 | Park et al. |
| 2022/0366610 A1* | 11/2022 | Hur ........................ H04N 19/96 |

OTHER PUBLICATIONS

I. Daribo, R. Furukawa, R. Sagawa and H. Kawasaki, "Adaptive arithmetic coding for point cloud compression," 2012 3DTV—Conference: The True Vision—Capture, Transmission and Display of 3D Video (3DTV-CON), Zurich, Switzerland, 2012, pp. 1-4, doi: 10.1109/3DTV.2012.6365475. (Year: 2012).*

Patent Cooperation Treaty, International Search Report for International application No. PCT/IB2019/0012368 mailed Jun. 8, 2020.

Gustavo Sandri et al., "Region of Interest Coding for RAHT", 126 MPEG Meeting, Mar. 2019, XP030212073.

Lasserre (Blackberry) S et al: "[GPCC][CE 13.22 related] An improvement of the planar coding mode", 128, MPEG Meeting; Oct. 7-11, 2019, Geneva, XP030221086.

Tu Chenxi et al., "Real-Time Streaming Point Cloud Compression for 3D LiDAR Sensor Using U-Net", IEEE Access, vol. 7, Aug. 2019, XP011742334.

Stefan Gumhold et al., "Predictive point-cloud compression", Jul. 31, 2005, 1077952576-1077952576, Jul. 2005, pp. 137-es, XP058302295.

Lasserre (Blackberry) S et al: "[GPCC][CE 13.22 related] An improvement of the planar coding mode", 128, MPEG Meeting; Oct. 7-11, 2019, Geneva, XP030221087.

Schwarz, Sebastian et al., "Emerging MPEG Standards for Point Cloud Compression", IEEE Journal on Emerging and Selected Topics in Circuits and Systems, IEEE, Piscataway, NJ, USA, vol. 9, No. 1, Mar. 2019, pp. 133-148, XP011714044.

United States Patent and Trademark Office (USPTO) Office Action for U.S. Appl. No. 17/765,015 mailed Jun. 12, 2024, 22 pages.

In-Wook Song et al., "Progressive compression of PointTexture images" article in Proceedings of SPIE, Visual Communications and Image Processing 2004, Jan. 2004, 4 pages.

Miguel Branco Roque Nazare Ferreira, "Dynamic 3D Point Cloud Compression", Master of Science Thesis from Tecnico Lisboa, Nov. 2017, 110 pages.

Armin Hornung et al. "OctoMap: an efficient probabilistic 3D mapping framework based on octrees", Autonomous Robots, 2013, Preprint, 17 pages.

"G-PCC codec description v4" ISO/IEC JTC 1 S/C 29 W/G 11 coding of moving pictures and audio convenorship: UNI (Italy), Jul. 2019, 62 pages.

European Patent Office (EPO), Extended European Search Report (EESR), Application No. 19200890.2, Dated: Mar. 20, 2020, 11 pages.

China National Intellectual Property Administration (CNIPA): Office Action for Application No. 201980101940.0, dated Sep. 5, 2024, 5 pages.

United States Patent and Trademark Office (USPTO): Office Action for U.S. Appl. No. 17/771,246, Dated Sep. 19, 2024, 69 pages.

Canadian Intellectual Property Office (CIPO) Office Action for Application No. 3, 153,825, dated Aug. 29, 2024, 4 pages.

* cited by examiner

ANGULAR PRIORS FOR IMPROVED PREDICTION IN POINT-PREDICTIVE TREES

FIELD

The present application generally relates to point cloud compression and, in particular to methods and devices for improved compression of coordinates of points of point clouds.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three coordinate location (X, Y, Z) and, in some cases, other attributes like color data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of 3D scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds. Such methods may result in savings in storage requirements (memory) through improved compression, or savings in bandwidth for transmission of compressed data, thereby resulting in improved operation of 3D vision systems, such as for automotive applications, or improved speed of operation and rendering of virtual reality systems, as examples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
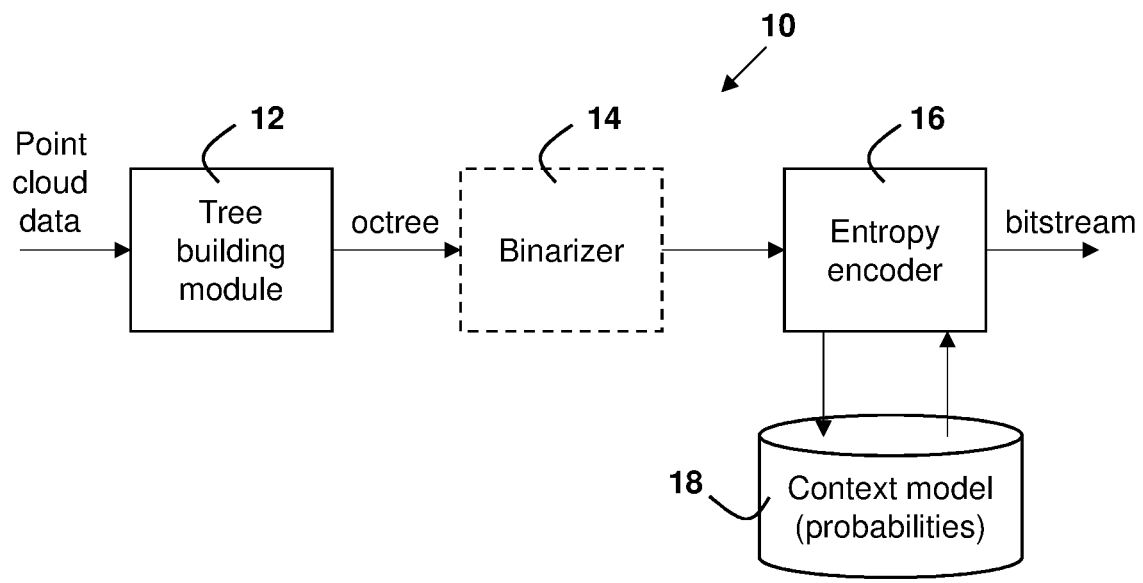
FIG. 1 shows a simplified block diagram of an example point cloud encoder.

The present application describes methods of encoding and decoding point clouds, and encoders and decoders for encoding and decoding point clouds.

In one aspect, there is provided a method of encoding a point cloud to generate a bitstream of compressed point cloud data representing a three-dimensional location of an object, the method comprising a) determining an elevation angle and an azimuthal angle associated with a point of a current node; b) determining a prediction point by computing a prediction radius; c) computing a residual point by subtracting the prediction point from the point of the current node; and d) encoding the residual point into the bitstream.

In another aspect, there is provided a method of decoding a bitstream of compressed point cloud data representing a three-dimensional location of an object, for generating a point cloud data, the method comprising a) determining an elevation angle and an azimuthal angle associated with a point of a current node; b) determining a prediction point by computing a prediction radius; c) decoding a residual point from the bitstream; and d) computing a point for the point cloud data by adding the residual point to the prediction point.

In yet another aspect, there is provided an encoder for encoding a point cloud to generate a bitstream of compressed point cloud data, representing a three-dimensional location of a physical object, the encoder comprising: a processor; a memory; and an encoding application containing instructions executable by the processor that, when executed, cause the processor to a) determine an elevation angle and an azimuthal angle associated with a point of a current node; b) determine a prediction point by computing a prediction radius; c) compute a residual point by subtracting the prediction point from the point of the current node; and d) encode the residual point into the bitstream.

In yet another aspect, there is provided a decoder for decoding a bitstream of compressed point cloud data to produce a reconstructed point cloud representing a three-dimensional location of a physical object, the decoder comprising: a processor; a memory; and a decoding application containing instructions executable by the processor that, when executed, cause the processor to a) determine an elevation angle and an azimuthal angle associated with a point of a current node; b) determine a prediction point by computing a prediction radius; c) decode a residual point from the bitstream; and d) compute a point for the point cloud data by adding the residual point to the prediction point.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data. The tree-like structure of partitioning of volumes into sub-volumes may be referred to as a "parent" and "child" relationship, where the sub-volumes are child nodes or child sub-volumes to the parent node or parent volume. Sub-volumes within the same volume may be referred to as sibling nodes or sibling sub-volumes.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three components value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-colored, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points that much more challenging.

Tree-Based Structures

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

The three-dimensional volume for the point cloud can also be define by using a bounding box. A quad-tree plus binary-tree (QTBT) structure for the bounding box allow to partition the point-cloud in non-cubic volumes which may better represent the overall shape of the point cloud or objects within the point-cloud. A quad-tree (QT) partitioning splits a volume into four sub-volumes, for example by splitting the volume using two planes cutting the volume into four parts. A binary tree (BT) partitioning splits a volume into two sub-volumes, for example by splitting the volume using one plane cutting the volume into two parts.

A commonly-used tree structure is an octree. In this structure, the volumes/sub-volumes are all cubes and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. A KD-tree may typically be obtained by applying recursively a Binary Tree (BT) partitioning.

The partitioning of a volume is not necessarily into two sub-volumes (KD-tree) or eight sub-volumes (octree), but could involve other partitions, including division into non-cuboid shapes or involving non-adjacent sub-volumes.

The present application may refer to octrees for ease of explanation and because they are a popular candidate tree structure for automotive applications, but it will be understood that the methods and devices described herein may be implemented using other tree structures.

Reference is now made to FIG. 1, which shows a simplified block diagram of a point cloud encoder 10 in accordance with aspects of the present application. The point cloud encoder 10 includes a tree building module 12 for receiving point cloud data and producing a tree (in this example, an octree) representing the geometry of the volumetric space containing the point cloud and indicating the location or position of points from the point cloud in that geometry.

In the case of a uniformly partitioned tree structure, like an octree, each node may be represented by a sequence of occupancy bits, where each occupancy bit corresponds to one of the sub-volumes in the node and signals whether than sub-volume contains at least one point or not. Occupied sub-volumes are recursively split up to a maximum depth of the tree. This may be termed the serialization or binarization of the tree. As shown in FIG. 1, in this example, the point cloud encoder 10 includes a binarizer 14 for binarizing the octree to produce a bitstream of binarized data representing the tree.

This sequence of bits may then be encoded using an entropy encoder 16 to produce a compressed bitstream. The binary entropy encoder 16 may encode the sequence of bits using a context model 18 that specifies probabilities for coding bits based on a context determination by the entropy encoder 16. The context model 18 may be adaptively updated after coding of each bit or defined set of bits. The entropy encoder 16 may, in some cases, be a binary arithmetic encoder. The binary arithmetic encoder may, in some implementations, employ context-adaptive binary arithmetic coding (CABAC). In some implementations, coders other than arithmetic coders may be used.

In some cases, the entropy encoder 16 may not be a binary coder, but instead may operate on non-binary data. The output octree data from the tree building module 12 may not be evaluated in binary form but instead may be encoded as non-binary data. For example, in the case of an octree, the eight flags within a sub-volume (e.g. occupancy flags) in their scan order may be considered a $2^8$-1 bit number (e.g. an integer having a value between 1 and 255 since the value 0 is not possible for a split sub-volume, i.e. it would not have been split if it was entirely unoccupied). This number may be encoded by the entropy encoder using a multi-symbol arithmetic coder in some implementations. Within a sub-volume, e.g. a cube, the sequence of flags that defines this integer may be termed a "pattern".

A convention that is typically used in point cloud compression is that an occupancy bit value of 1 signals that the associated node or volume is "occupied", i.e. that it contains at least one point, and an occupancy bit value of 0 signals that the associated node or volume is "unoccupied", i.e. that it contains no points. More generally, an occupancy bit may have a value indicating occupied or a value indicating unoccupied. In the description below for ease of explanation, example embodiments may be described in which the convention of 1=occupied and 0=unoccupied is used; however it will be understood that the present application is not limited to this convention.

Figure 2:
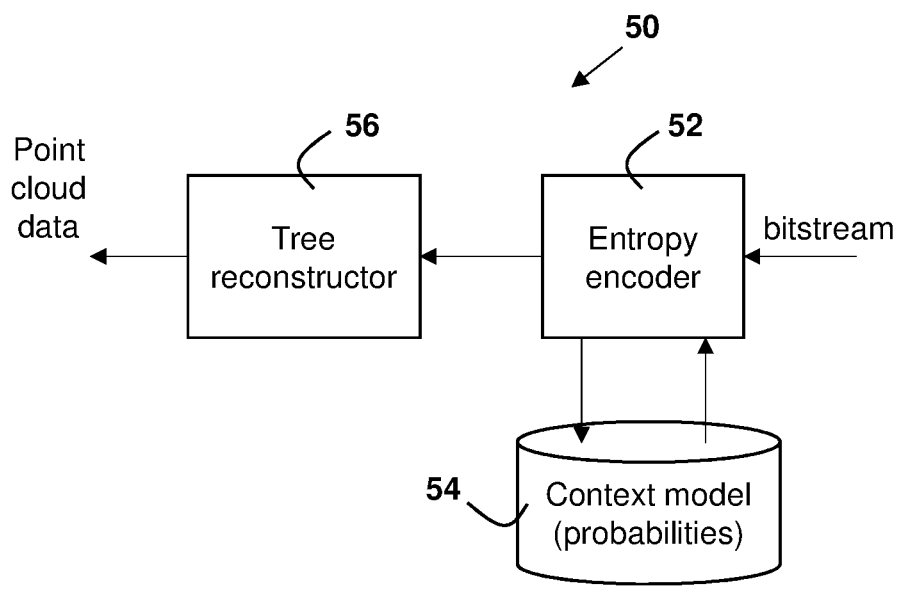
FIG. 2 shows a simplified block diagram of an example point cloud decoder.

A block diagram of an example point cloud decoder 50 that corresponds to the encoder 10 is shown in FIG. 2. The point cloud decoder 50 includes an entropy decoder 52 using the same context model 54 used by the encoder 10. The entropy decoder 52 receives the input bitstream of compressed data and entropy decodes the data to produce an output sequence of decompressed bits. The sequence is then converted into reconstructed point cloud data by a tree reconstructor 56. The tree reconstructor 56 rebuilds the tree structure from the decompressed data and knowledge of the scanning order in which the tree data was binarized. The tree reconstructor 56 is thus able to reconstruct the location of the points from the point cloud (subject to the resolution of the tree coding).

In European patent application no. 18305037.6, the present applicants described methods and devices for selecting among available pattern distributions to be used in coding a particular node's pattern of occupancy based on some occupancy information from previously-coded nodes near the particular node. In one example implementation, the occupancy information is obtained from the pattern of occupancy of the parent to the particular node. In another example implementation, the occupancy information is obtained from one or more nodes neighboring the particular node. The contents of European patent application no. 18305037.6 are incorporated herein by reference. This is referred to as determining a "neighbor configuration" and selecting a context (i.e. a pattern distribution) at least partly based on the neighbor configuration.

In European patent application no. 18305415.4, the present applicants described methods and devices for binary entropy coding occupancy patterns. The contents of European patent application no. 18305415.4 are incorporated herein by reference.

Predictive-Point Trees

Figure 3:
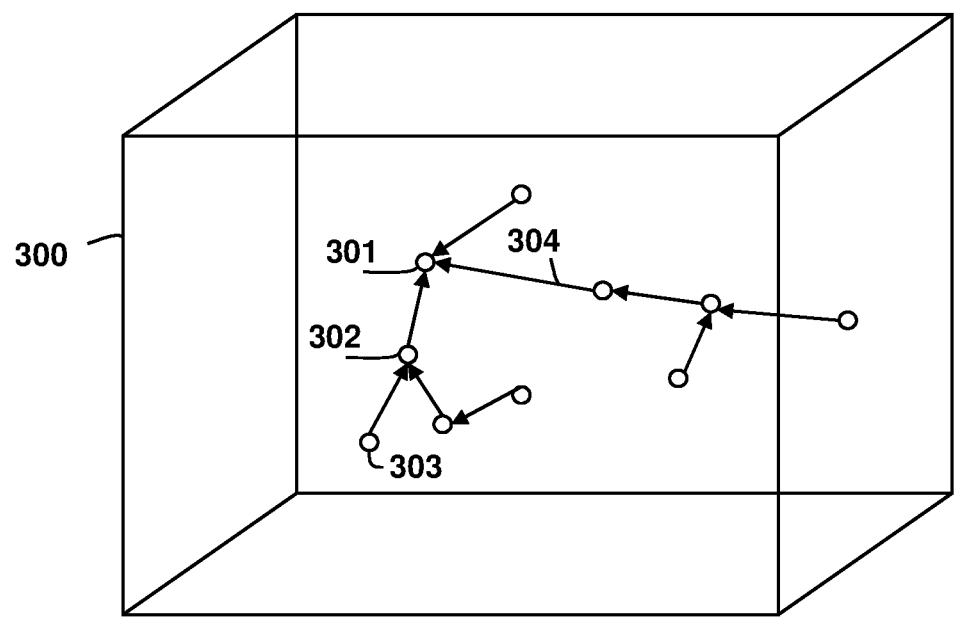
FIG. 3 illustrates a predictive-point tree for representing a point cloud.

A predictive-point tree is illustrated with respect to FIG. 3. Each node of the tree is illustrated by a circle, such as circles 301, 302, or 303 and is associated with a point of the point cloud. Each arrow 304 corresponds to a predictive branch of the tree, with the arrow pointing towards a parent node. In this example, the root node of the tree is node 301, as it has no parent node. Node 302 is an internal node of the tree, as it has a parent and at least one child node. Node 303 is a leaf node, as it has no children.

Points associated with the nodes of the predictive-point tree belong to a part of the point cloud contained in volume 300. The structure of the predictive-point tree is determined by the encoding process, in order to obtain an optimal structure in terms of maximum compression of the point cloud within volume 300.

The (x,y,z) coordinates of a point associated with a node of the predictive-point tree are coded using the predictive-point tree coding structure by first determining predictive coordinates $(x_p, y_p, z_p)$ obtained from at least one point associated with an ancestor node or a sibling node, then subtracting the predictive coordinates from the coordinates to obtain residual coordinates, and finally coding the residual coordinates. Residual coordinates may be coded using an entropy coder.

Predictive coordinates $(x_p, y_p, z_p)$ may be obtained using a linear combination of the coordinates of points associated with ancestors or sibling nodes. The coefficients of the linear combinations may be selected from a set of possible linear combinations, and a selection index may be signaled. For instance, if $p_0$ is the coordinate of the point associated with the parent node, $p_1$ is the coordinate of the point associated with the grand-parent node, and $p_2$ is the coordinate of the point associated with the great-grand-parent node, some embodiments may use the following linear combinations.

$P=0 \times p_0 + 0 \times p_1 + 0 \times p_2$ (no prediction)

$P=1 \times p_0 + 0 \times p_1 + 0 \times p_2$ (delta prediction)

$P=2 \times p_0 - 1 \times p_1 + 0 \times p_2$ (linear prediction)

$P=2 \times p_0 + 1 \times p_1 - 1 \times p_2$ (parallelogram prediction)

The point associated with the root node, hereinafter, the "root point", cannot be coded using predictive coordinates, and its coordinates are coded directly relative to volume 300.

A Golomb Rice coding, an exp-Golomb coding, or another variable length coding approach can be used as an entropy coder for coding the residual coordinates. Alternatively, contextual arithmetic coding can also be used. Parameters of the entropy coder can be chosen depending on the linear combination or the distance between ancestors, such as for example, the average distance between parent and grand-parent, or the average distance between grand-parent and great-grand-parent.

The construction of the predictive-point tree for a set of points may be performed as follows. In one embodiment, the encoder first selects one point from the set of points to be associated with the root node of the predictive-point tree. This single root node is first considered as a leaf node because it has no child node yet. The selected point is removed from the set of points to be processed. Then, the encoder recursively selects a point from the set of points, associates the selected point with a node of the predictive-point tree, and removes the selected point from the set of points to be processed. The recursive process ends when the set of points becomes empty.

In a variant, the encoder first identifies clusters of points and builds a predictive-point tree for each cluster of points by taking the closest point to the center of the cluster as the root point and associating the other points of the cluster as its children. Then, the set of root points is considered as a new set of points to be clustered, and the process is applied recursively until the set of root points contains only one point. This variant is a bottom-up process that constructs the tree from the leaf nodes up to the root node.

The predictive structure of a predictive-point tree is entirely determined by the prediction selection index associated with each node and the number of child nodes for each node. Point coordinates can then be obtained by the decoder from the predictive structure and the residual coordinates of each point. Thus, a bitstream signaling a predictive-point tree is composed of the number of child nodes per node, the prediction selection index, and the residual coordinates for each node.

The scanning order of the tree may be performed following a predetermined coding order. For example, the scanning order of the predictive-point tree may be performed following a depth-first traversal of the nodes. In another example, the scanning order of the predictive-point tree may be following a breadth-first traversal of the nodes.

In a variant, the number N of child nodes for a node is less than or equal to a maximum bound. The number N may be coded in the bitstream for each node, knowing the maximum bound, using a Golomb Rice coding, for example. The maximum bound may also be coded in the bitstream.

In another variant, the number of points being associated with child nodes of a node is fixed or deduced algorithmically from information available to the decoder. In such a case, there is no need to signal the number of child nodes for each node.

LiDAR Acquired Point Clouds

Typically, LiDAR-acquired point clouds are acquired by a set of spinning lasers. An exemplary LiDAR device is shown with respect to FIG. 4.

Figure 4:
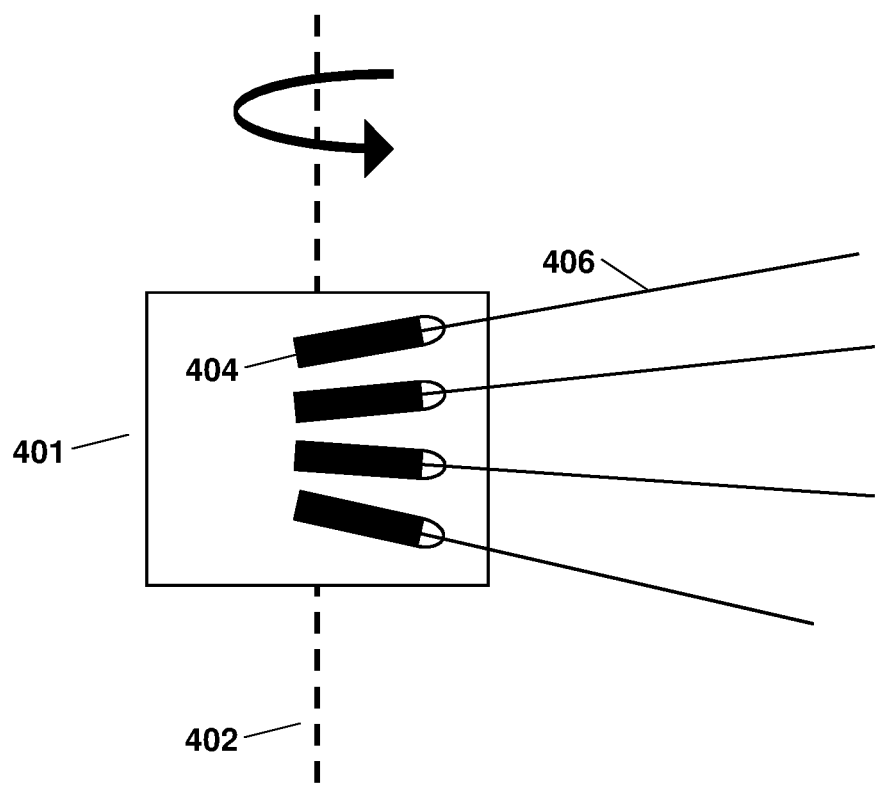
FIG. 4 shows a simplified illustration of an example of a beam assembly for acquiring point clouds.

As seen in FIG. 4, the LiDAR device 401 comprises a vertically arranged array of lasers 404 mounted on a spinning head, such that each laser rotates around the head axis 402. Each laser emits a laser beam 406.

Figure 5:
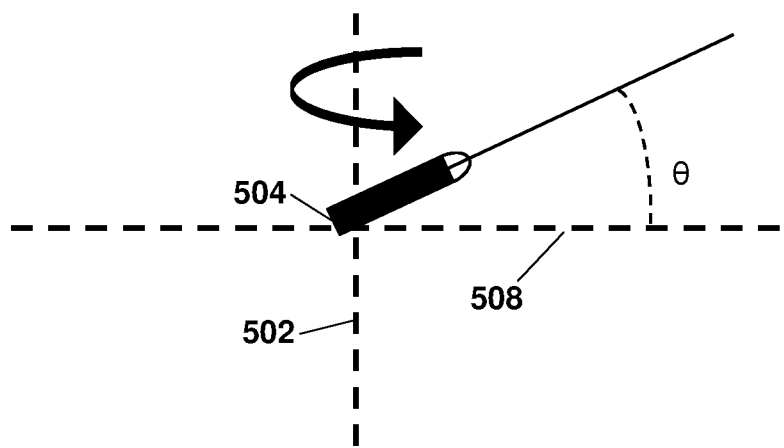
FIG. 5 shows a simplified illustration of an example of a single beam emitter in the beam assembly.

Reference is now made to FIG. 5, which illustrates a single laser 504 rotating around a head axis 502 and having an angle θ with respect to the plane 508 which is perpendicular to the head axis 502. Naturally, points acquired by the laser will have an angle of acquisition which will be very close to θ, due to noise and measurement precision.

Figure 6:
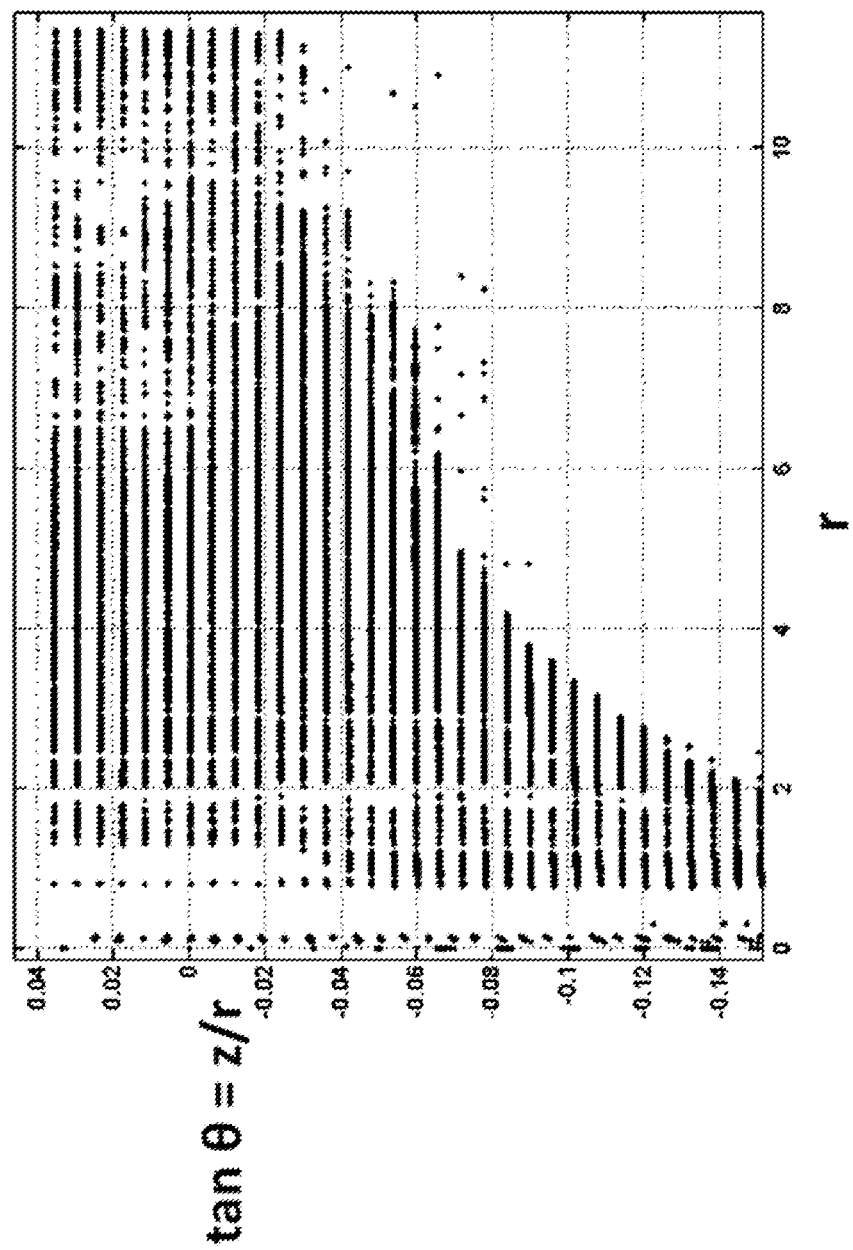
FIG. 6 shows a diagram including points of an example point cloud expressed in the $(r, \theta)$ plane.
Figure 7:
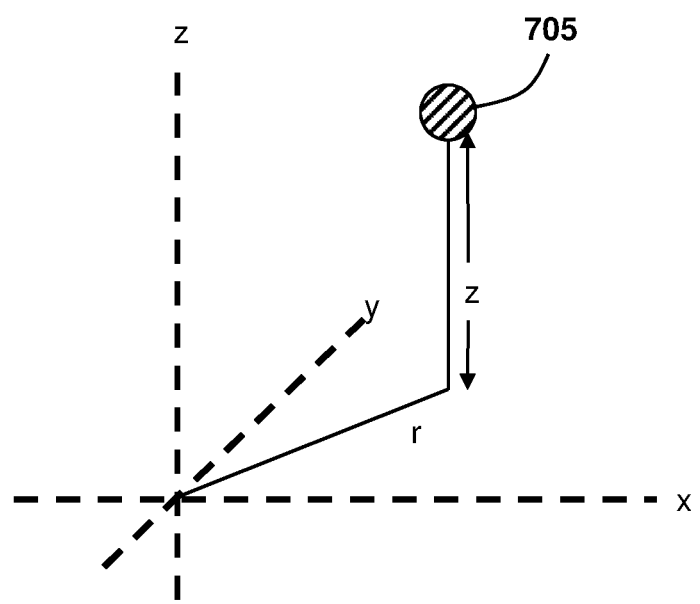
FIG. 7 shows an example assignment of coordinate axes relative to a point of the point cloud.

FIG. 6 illustrates points of a LiDAR-acquired point cloud on a diagram where the vertical axis represents tan(θ), or z/r, and the horizontal axis represents r. By definition and as shown in FIG. 7, r is the horizontal distance of a point from the LiDAR's head (or beam assembly in general), and the tangent of the vertical angle tan(θ) is defined as the ratio z/r where z is the vertical elevation of the point 705 relative to the LiDAR's head.

Somewhat fixed laser angles tan(θ) can be clearly observed in the diagram. Positive angles signify that the lasers are pointed above the horizontal plane (i.e., towards the sky), while negative angles signify that the lasers are pointed below the horizontal plane (i.e., to the ground). Notably, lasers of the LiDAR are deliberately oriented at different angles—e.g., so that different lasers pick up different parts of the same tall object, like buildings, poles, tress, etc.

As can be seen from FIG. 6, the points of the point cloud can be represented in a "quasi" 2D space. For example, a representation is theoretically possible in the 2D space (x,y) and a finite set of vertical angles θ corresponding to the laser beams. Or equivalently in the 2D polar space (φ, r), where φ is the azimuthal angle, and the finite set of vertical angles θ. In other words, one may represent the points in spherical coordinates (φ, r, θ) where θ can take only a finite number of values. This is a consequence of occlusions, which lead to only at most one point per (φ, θ). This quasi 2D space is theoretical but, practically, measurement noise/precision and time integration does not lead to a strictly finite set of possible θ, which is a consequence of the mechanical mounting of the lasers. Instead, it is observed that the values of θ are spread around a finite number of values $\theta_{laser}$ and one must deal with the issue of "noise" around these values.

The aforementioned quasi-2D structure depends mainly on the position/orientation of one or more LiDARs (or beam assemblies in general) and the intrinsic characteristics of the LiDAR(s). As will be described in more detail below, it can be thus advantageous to include syntax elements (e.g., parameters, flags) into the bitstream that described characteristics of the LiDAR(s) (or beam assembly/assemblies in general). These syntax elements may indicate at least one of a reference location of the beam assembly, origin locations of specific beams, or beam angles of specific beams. Including these syntax elements into the bitstream can be done at a frame or sequence level. In any case, this data should be present as close as possible to the compressed data bitstream to ensure decodability of the bitstream and minimize the risk of losing data needed for decodability.

Taking note of the above, some embodiments of the application seek to use knowledge obtained from LiDAR characteristics (or characteristics of the relevant beam assemblies), of vertical laser angles $\theta_{laser}$ in an efficient representation of the point cloud such that the compression is improved.

Azimuthal Angles

Figure 8:
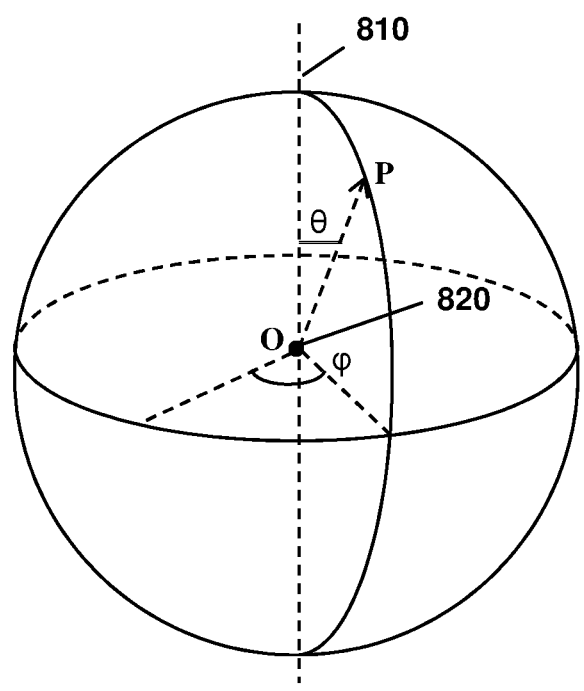
FIG. 8 shows an illustration of spherical coordinates, azimuthal angle $\varphi$ and elevation angle $\theta$.

Azimuthal angle φ and elevation angle θ are defined as shown in FIG. 8. In particular, if the main axis of the rotating LiDAR head is the vertical axis 810, then the elevation angle θ may be defined as zero for a point "P" at the vertical of "O", shown as point 820 (i.e. θ is the angle between the vertical axis line and the line [OP]), or alternatively θ may be defined as zero for points belonging to the horizontal plane passing by "O" (i.e. θ is the angle between the horizontal plane passing by "O" and the line crossing [OP]). In the latter case, it is common to call the angle θ as the altitude angle.

Typically, a rotating head of the LiDAR probes points one by one, for example from the highest laser beam to a lowest laser beam, at a somewhat constant rate, while the head rotates continuously. For example, reference is now made to FIG. 9.

Figure 9:
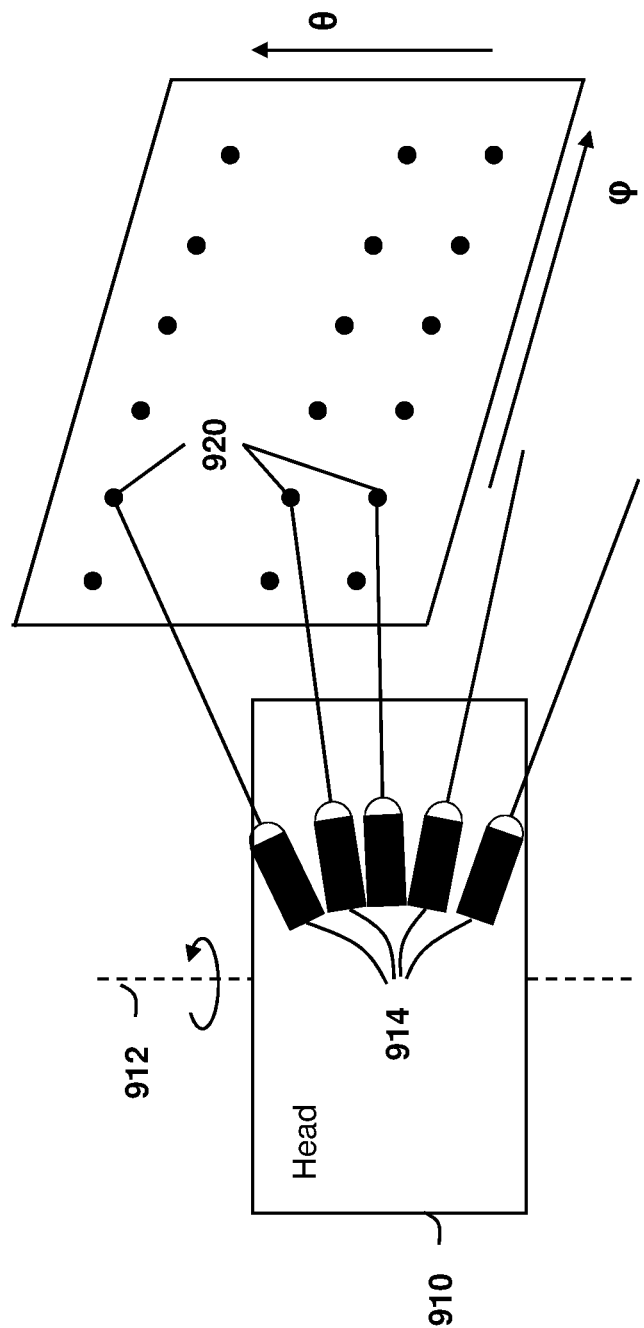
FIG. 9 shows the sensing of a point by a rotating LiDAR head.

In the embodiment of FIG. 9, a LiDAR head 910 rotates along axis 912. A plurality of lasers 914 may sense a plurality of points 920.

Figure 10:
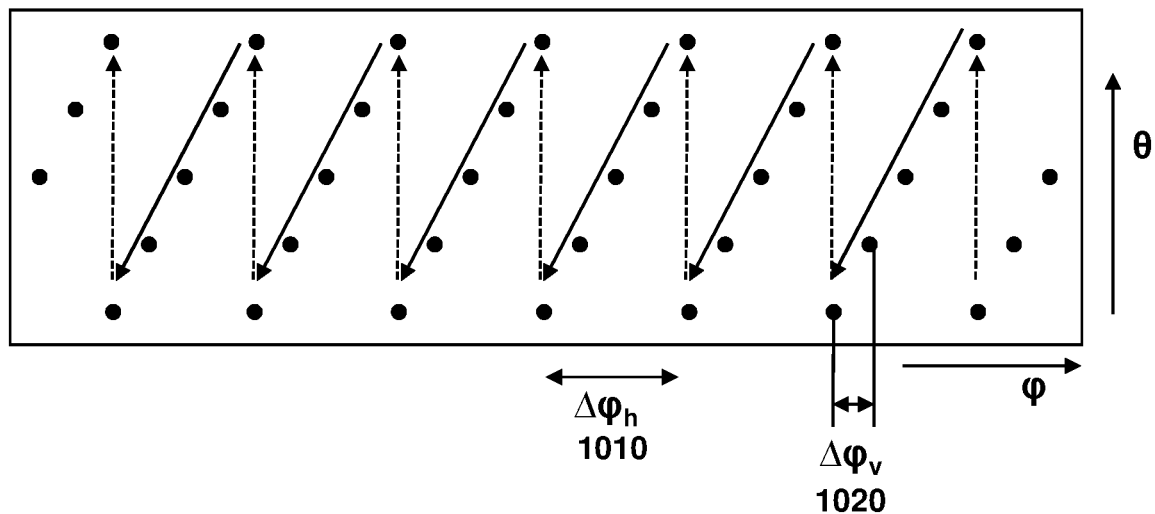
FIG. 10 shows a typical scanning order by a rotating LiDAR head.

Because the head is moving, the scanning order follows the embodiment of FIG. 10 in the (φ, θ) angular plane. Due to the continuous and smooth rotation of the head, as well as the constant rate of acquiring points, the azimuthal angular distance between the acquired points is constant.

Therefore, as seen in FIG. 10, the horizontal azimuthal distance Δφh 1010 between two points probed by a same laser is constant, up to some unavoidable acquisition of noise and quantization. Also, the azimuthal distance Δφ$_v$ between two points probed by two adjacent lasers is also constant, as shown by the distance 1020. While this is a horizontal distance, in the present disclosure it is referred to as vertical azimuthal distance since the distance is determined based on two vertically displaced lasers.

Figure 11:
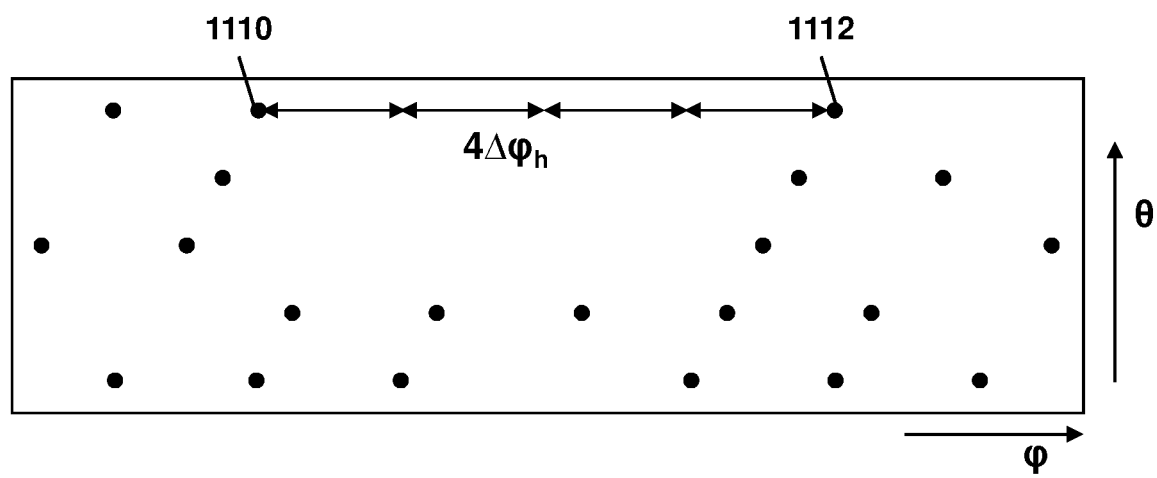
FIG. 11 shows the scanning of a LiDAR head where some points are not registered, and azimuthal angle priors are essentially multiples of $\Delta\varphi$.

However, the LiDAR does not acquire every point. In particular, the laser misses points regularly because there is no object reflecting the laser. Practically, the azimuthal angular distance between two points is a multiple of elementary shifts Δφh or Δφv, as depicted in FIG. 11. These shifts are known as azimuthal priors.

As seen in FIG. 11, the distance between two points 1110 and 1112 is equal to 4Δφh.

Using the above, one issue is how to obtain better compression of the geometry of a LiDAR acquired point cloud by using azimuthal angular distances between points being multiples of elementary shifts Δφh or Δφv.

Problem

The angular priors, related to the elevation angles θ and/or the azimuthal angles φ of the acquired points, associated with the LiDAR-based capture of the geometry of the point cloud, strongly constrain the structure of the point cloud. Basically, up to sensor noise and quantization of the positions, the points are not arbitrarily placed in the three-dimensional space, but instead are located on a two-dimensional discrete grid in the angular (θ,φ) space and may be at an arbitrary distance r from the LiDAR center.

Thus, instead of considering the points of such a point cloud in the Cartesian three-dimensional space (x,y,z), it may be advantageous to use the representation into spherical coordinates (θ,φ,r) to obtain better compression of the geometry of the point cloud. In particular, angular priors may help in compressing the predictive-point tree representation of the point clouds.

The present disclosure seeks to provide solutions which use angular priors in LiDAR-acquired point clouds to improve the compression of the geometry representation in predictive-point trees.

This may be achieved by reducing the bitrate needed for coding the prediction mode used to determine the prediction and the residual coordinates.

Solutions

According to at least one embodiment of the present disclosure, the solution consists in improving the prediction points such that the residual points have smaller amplitude, thereby requiring fewer bits for coding.

The use of angular priors may be implicit or explicit. For example, in some embodiments, dedicated syntax may be used to signal which prediction mode is used and/or to signal parameters (e.g. laser index or number of elementary azimuthal shifts) associated with the use of angular priors.

Figure 12:
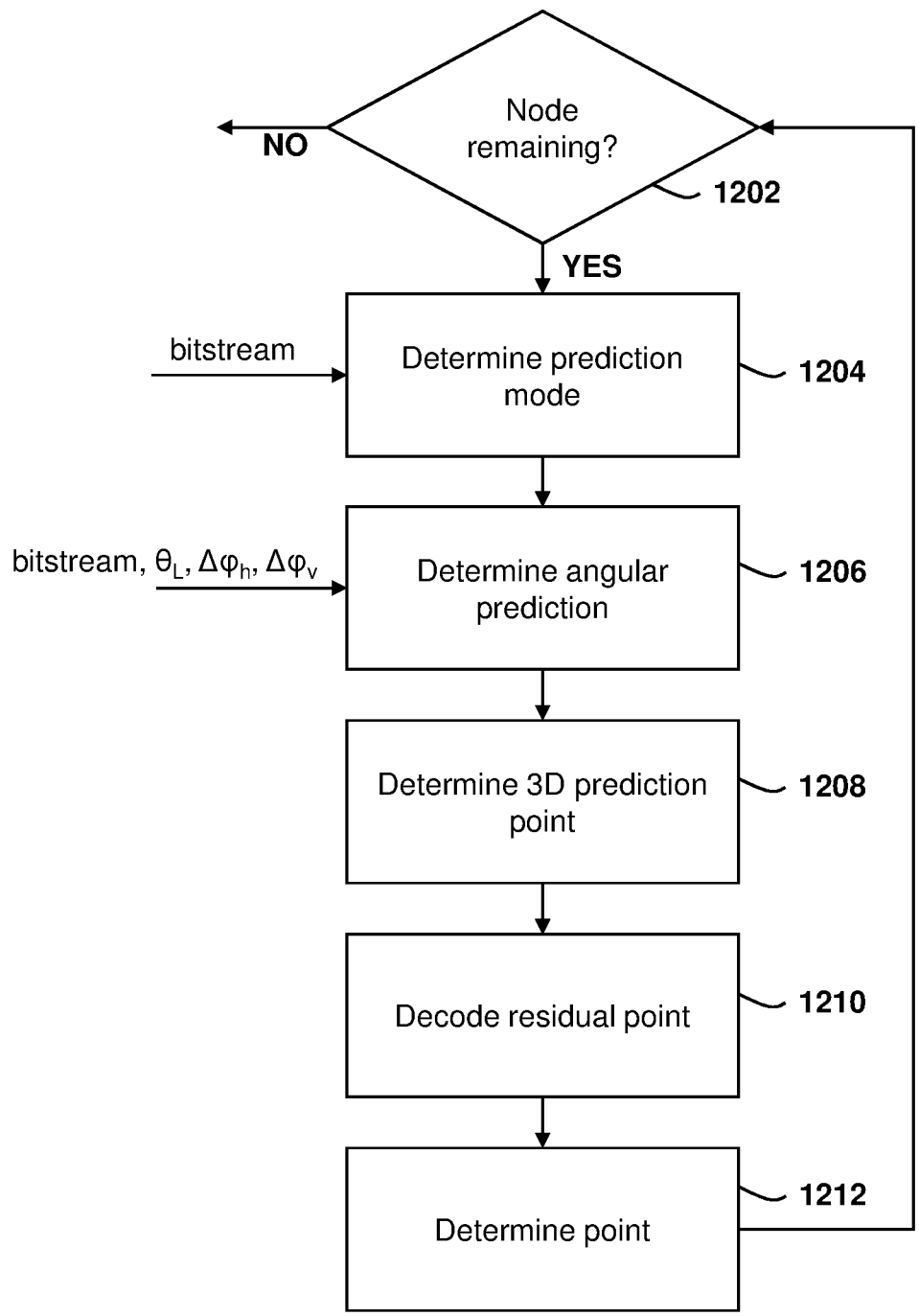
FIG. 12 shows, in flowchart form, one example method of decoding point cloud data using angular priors.

Reference is made to FIG. 12, which illustrates a method according to at least one embodiment of the present disclosure.

The method begins at operation 1202 where it is determined if there are any nodes remaining. If there are no nodes remaining, the method ends. If there are nodes remaining, the method proceeds to operation 1204 where the prediction mode is determined. The prediction mode may be an angular prediction mode, as described below, a delta prediction mode, a linear prediction mode, or other prediction modes. The prediction mode may be obtained from dedicated syntax in the bitstream.

When the prediction mode is an angular prediction mode, the method proceeds to operation 1206 where an angular prediction for the point is determined in accordance to the prediction mode determined in 1204. The angular prediction P$_{ang}$ of θ and/or φ is obtained by using angular priors that may comprise any of laser angles θ$_L$, azimuthal elementary shifts Δφ$_h$, and Δφ$_v$. The prediction may also depend on already decoded points and their respective θ and φ values. Optionally, the bitstream may comprise syntax elements to specify usage of angular priors such as a laser index L and a number N$_s$ of applied elementary shifts.

The angular prediction P$_{ang}$ may thus be seen as a point belonging to the one-dimensional space θ, the one-dimensional space φ, or the two-dimensional space (θ,φ).

Then, the method proceeds to operation 1208 where a three-dimension prediction point P$_{pred}$ is determined from the angular prediction P$_{ang}$. In at least some embodiments, P$_{pred}$ may be determined in part from already decoded points associated with the ancestor nodes of the current nodes.

Then, at operation 1210, the residual point P$_{res,dec}$ is decoded. The point P$_{dec}$ may then be computed using equation 1 at operation 1212.

$$P_{dec} = P_{pred} P_{res,dec} \qquad (1)$$

The method then returns to operation 1202. In some embodiments, known as "lossy coding", the decoded residual point P$_{res,dec}$ may also be the result of a dequantization process of decoded residual information.

Figure 13:
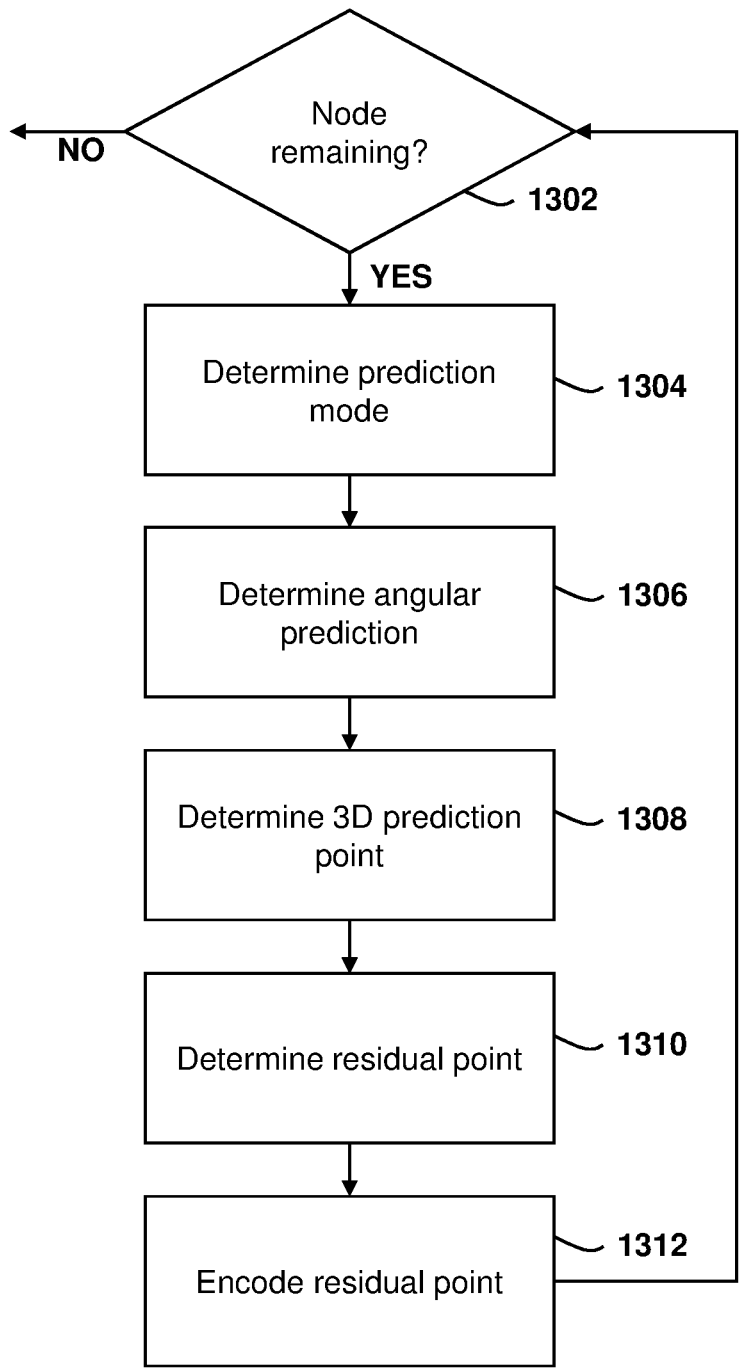
FIG. 13 shows, in flowchart form, one example method of encoding point cloud data using angular priors.

The corresponding encoding method is illustrated with respect to FIG. 13.

The method begins at operation 1302 where it is determined if there are any nodes remaining. If there are no nodes remaining, the method ends. If there are nodes remaining, the method proceeds to operation 1304 where the prediction mode is determined. The prediction mode may be an angular prediction mode, as described below, a delta prediction mode, a linear prediction mode, or other prediction modes. In embodiments where the prediction mode is obtained from dedicated syntax in the bitstream, the encoder may use optimization technics to choose a prediction mode, for instance by minimizing a number of bits needed to code each node's data (e.g. the prediction mode and the residual coordinates), or for instance by optimizing a rate-distortion trade off in a lossy coding (e.g. Lagrangian cost minimization where the cost C=λR+D is defined as λ times the number of bitrate R needed to code node's data plus the distortion D introduced on residual coordinates, λ being known as the Lagrange parameter).

When the prediction mode is an angular prediction mode, the method proceeds to operation 1306 where an angular prediction for the point is determined in accordance to the prediction mode determined in 1304. The angular prediction $P_{ang}$ of θ and/or φ is obtained by using angular priors that may comprise any of laser angles $θ_L$, azimuthal elementary shifts $Δφ_h$, and $Δφ_v$. The prediction may also depend on already encoded points and their respective θ and φ values.

The angular prediction $P_{ang}$ may thus be seen as a point belonging to the one-dimensional space θ, the one-dimensional space φ, or the two-dimensional space (θ,φ).

Then, the method proceeds to operation 1308 where a three-dimension prediction point $P_{pred}$ is determined from the angular prediction $P_{ang}$. In at least some embodiments, $P_{pred}$ may be determined in part from already encoded points associated with the ancestor nodes of the current nodes.

Then, at operation 1310, the residual point $P_{res}$ is computed by subtracting the prediction $P_{pred}$ from the point to be encoded. At operation 1312, the residual point $P_{res}$ is encoded. In some embodiments, known as "lossy coding", the residual $P_{res}$ may be further subject to a quantization process before encoding.

The method then returns to operation 1302.

In case the residual is coded losslessly, i.e. $P_{res,dec}=P_{res}$, the decoded point is exactly the original point, the compression is said to be lossless. Otherwise $P_{res,dec}$ is an approximation of $P_{res}$ and some distortion is introduced. The compression is said to be lossy because the decoded point cloud does not match exactly the original point cloud coded by the encoder.

Figure 14:
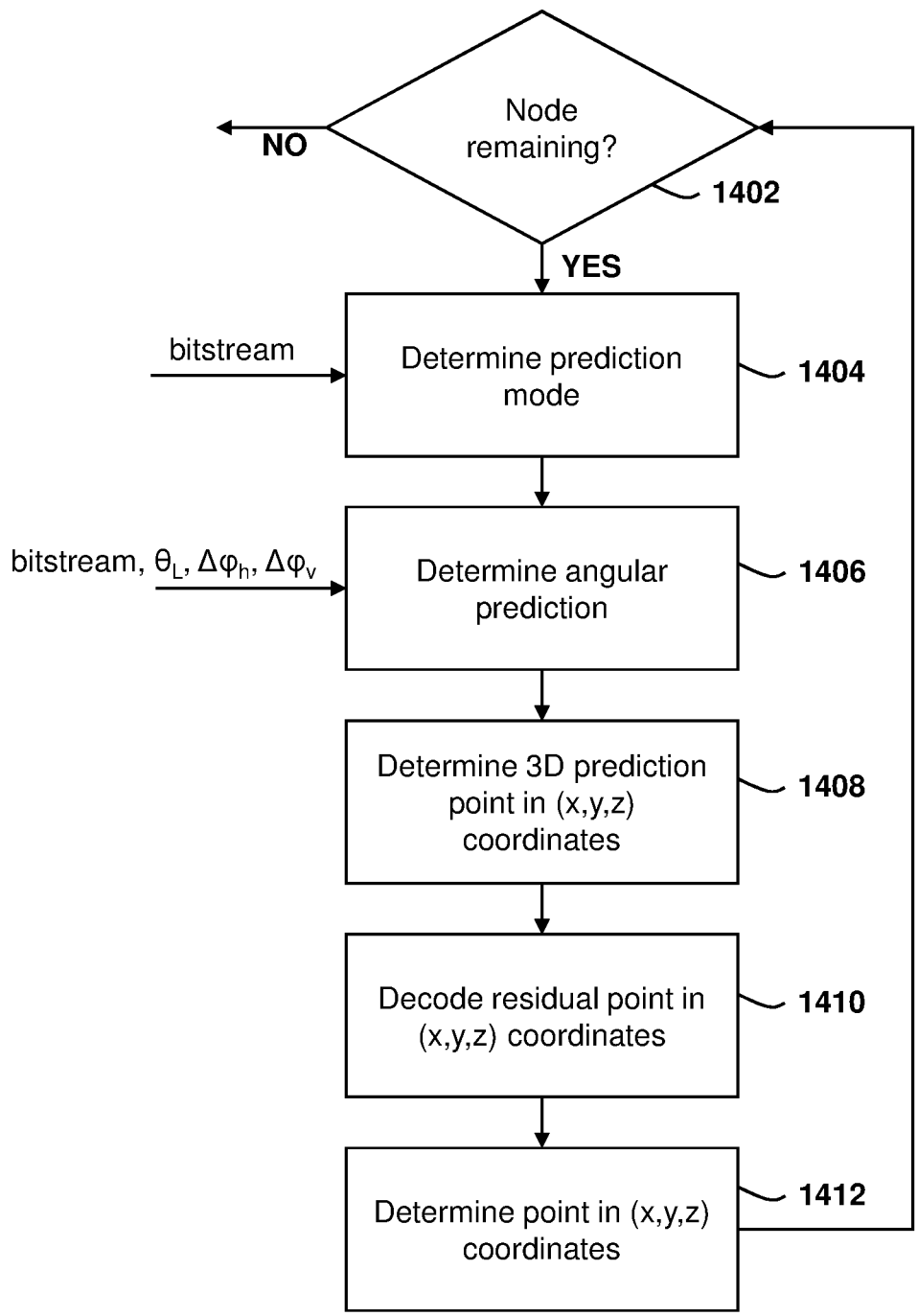
FIG. 14 shows, in flowchart form, one example method of decoding point cloud data using angular priors.

It is difficult to construct an invertible and discrete space transform $T_{sph2xyz}$ from spherical coordinates to cartesian coordinates without requiring additional precision in the transformed spaces. Consequently, in a lossless scenario, one may avoid such a space transform after the residual has been applied and instead should use the residual after space transforms, such that the residual compensates for the error induced by the transform. In this case, a preferred embodiment is illustrated at FIG. 14.

The method begins at operation 1402 where it is determined if there are any nodes remaining. If there are no nodes remaining, the method ends. If there are nodes remaining, the method proceeds to operation 1404 where the prediction mode is determined. The prediction mode may be an angular prediction mode, as described below, a delta prediction mode, a linear prediction mode, or other prediction modes. The prediction mode may be obtained from dedicated syntax in the bitstream.

When the prediction mode is the angular prediction mode, the method proceeds to operation 1406 where an angular prediction for the point is determined. The angular prediction $P_{ang}$ of θ and/or φ is obtained by using angular priors that may comprise any of laser angles $θ_L$, azimuthal elementary shifts $Δφ_h$, and $Δφ_v$. The prediction may also depend on already encoded points and their respective θ and φ values. Optionally, the bitstream may comprise syntax elements to specify usage of angular priors such as a laser index L and a number $N_s$ of applied elementary shifts.

Then, the method proceeds to operation 1408 where a three-dimension prediction point $P_{pred}$ is determined from the angular prediction $P_{ang}$. In at least some embodiments, $P_{pred}$ may be determined in part from already decoded points associated with the ancestor nodes of the current nodes. In this case, operation 1408 involves a transformation from spherical coordinates to cartesian coordinates. For example, the angular prediction $P_{ang}$ may be converted to a three dimensional angular point $P_{ang3D}$ in the (θ,φ,r) space, where the predicted radius may be determined from already encoded or decoded points, and then $P_{pred}$ is determined by converting $P_{ang3D}$ to cartesian coordinates using equation 2.

$$P_{pred}=T_{sph2xyz}(P_{ang3D}) \tag{2}$$

Then, at operation 1410, the residual point $P_{res,dec}$ is decoded. The point $P_{dec}$ may then be computed using equation 1, in cartesian coordinates, at operation 1412.

The method then returns to operation 1402.

Figure 15:
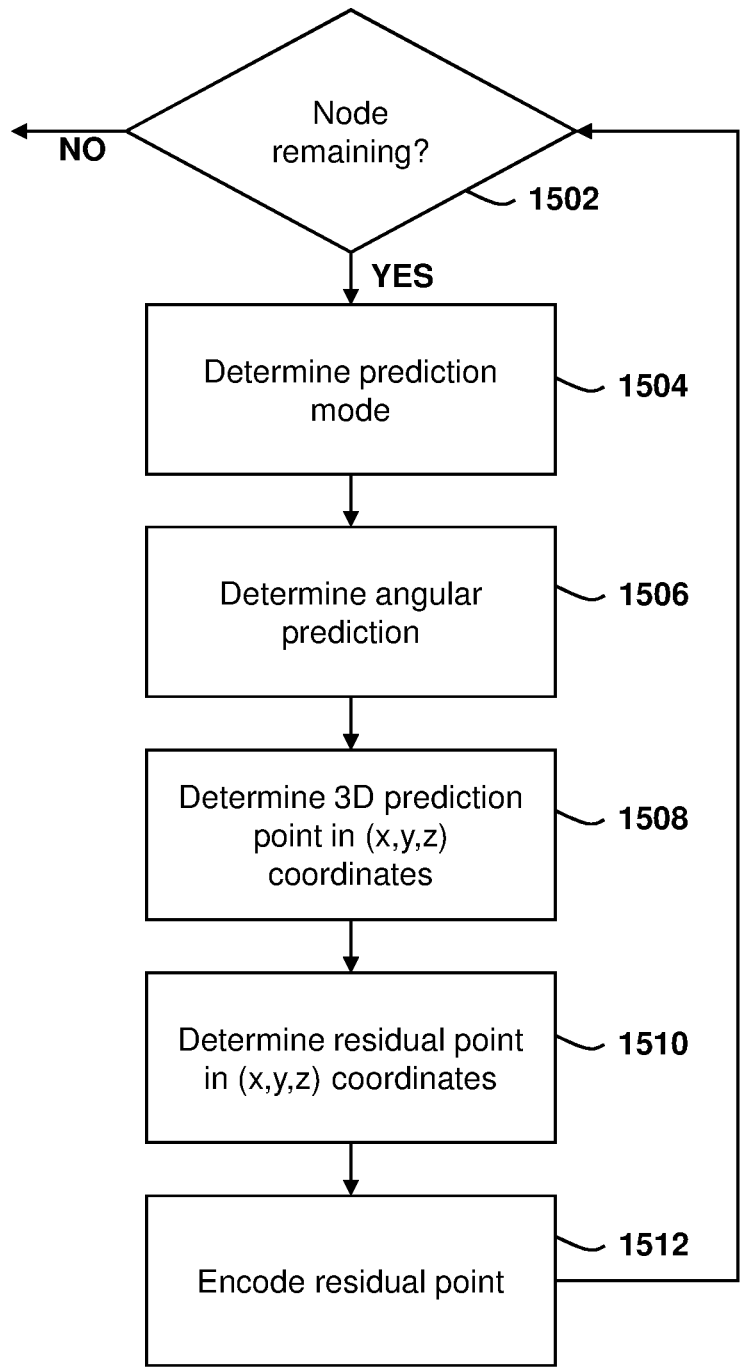
FIG. 15 shows, in flowchart form, one example method of encoding point cloud data using angular priors.

The corresponding encoding method is illustrated with respect to FIG. 15.

The method begins at operation 1502 where it is determined if there are any nodes remaining. If there are no nodes remaining, the method ends. If there are nodes remaining, the method proceeds to operation 1504 where the prediction mode is determined. The prediction mode may be an angular prediction mode, as described below, a delta prediction mode, a linear prediction mode, or other prediction modes.

When the prediction mode is the angular prediction mode, the method proceeds to operation 1506 where an angular prediction for the point is determined. The angular prediction $P_{ang}$ of θ and/or φ is obtained by using angular priors that may comprise any of laser angles $θ_L$, azimuthal elementary shifts $Δφ_h$, and $Δφ_v$. The prediction may also depend on already encoded points and their respective θ and φ values.

Then, the method proceeds to operation 1508 where a three-dimension prediction point $P_{pred}$ is determined from the angular prediction $P_{ang}$. In this embodiment, $P_{ang}=(θ_{ang},φ_{ang})$ is combined with a radius to obtain a three-dimensional point $P_{ang3D}$ in spherical coordinates which is then converted to cartesian coordinate using $T_{sph2xyz}$. Methods to determine a radius for $P_{pred}$ are discussed below.

Then, at operation 1510, the residual point $P_{res}$ is computed by subtracting the prediction $P_{pred}$ from the point to be encoded. At operation 1512, the residual point $P_{res}$ is encoded.

The method then returns to operation 1502.

In another example, a first cartesian point $P_{pred,1}$ is determined, without using angular priors, by any prediction method from the prior art for example. The first point $P_{pred,1}$ is then projected onto the sub cartesian space defined by angular priors. For example, when considering a first angular prediction $P_{ang}=(θ_L,φ_{pred})$, the rotating laser beam associated with the angle $θ_L$ defines a cone in the cartesian space, and the predicted azimuthal angle $φ_{pred}$ defines a half-plane in the cartesian space. The sub-space becomes the intersection of the cone and the half-plane, which is a line. The three-dimensional prediction point $P_{pred}$ is obtained as the image of $P_{pred,1}$ by the projector $π_{line}$ on the line, as shown by equation 3.

$$P_{pred}=π_{sub-space}(P_{pred,1})=π_{line}(P_{pred,1}) \tag{3}$$

Figure 16:
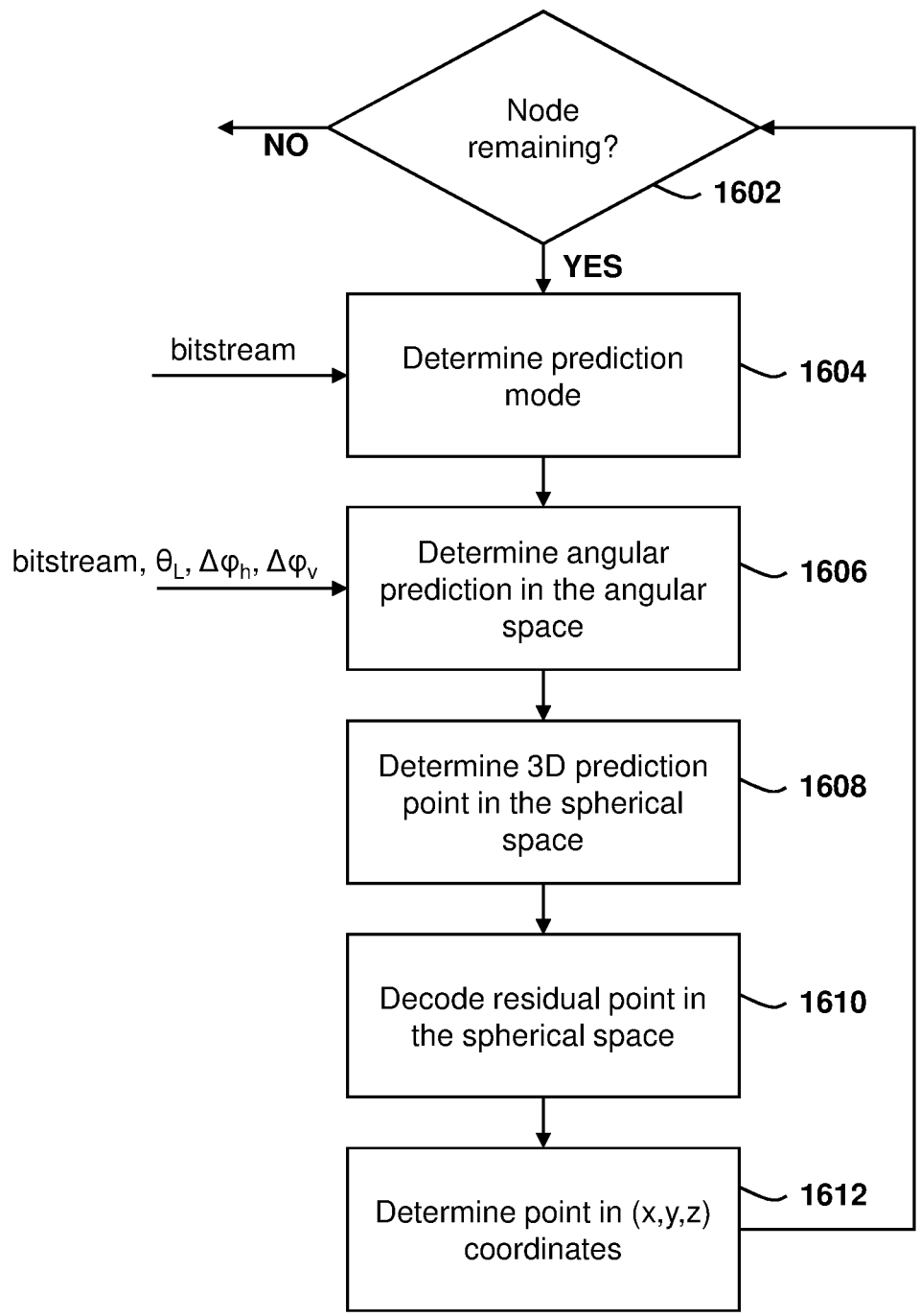
FIG. 16 shows, in flowchart form, one example method of decoding point cloud data using angular priors.

In lossy compression, it may be advantageous to profit from a residual $P_{res}$ that may be more compact in the spherical coordinates compared to the same residual expressed in cartesian coordinates. This leads to lower bitrates at the cost of some distortion introduced by the space transform $T_{sph2xyz}$ applied after decoding the residual, as illustrated in FIG. 16.

The method begins at operation 1602 where it is determined if there are any nodes remaining. If there are no nodes remaining, the method ends. If there are nodes remaining, the method proceeds to operation 1604 where the prediction mode is determined. The prediction mode may be an angular prediction mode, as described below, a delta prediction mode, a linear prediction mode, or other prediction modes. The prediction mode may be obtained from dedicated syntax in the bitstream.

When the prediction mode is the angular prediction mode, the method proceeds to operation 1606 where an angular prediction for the point is determined. The angular prediction $P_{ang}$ of $\theta$ and/or $\varphi$ is obtained by using angular priors that may comprise any of laser angles $\theta_L$, azimuthal elementary shifts $\Delta\varphi_h$, and $\Delta\varphi_v$. The prediction may also depend on already decoded points and their respective $\theta$ and $\varphi$ values. Optionally, the bitstream may comprise syntax elements to specify usage of angular priors such as a laser index L and a number $N_s$ of applied elementary shifts.

Then, the method proceeds to operation 1608 where a three-dimension prediction point $P_{pred}$ is determined from the angular prediction $P_{ang}$. In at least some embodiments, $P_{pred}$ may be determined in part from already decoded points associated with the ancestor nodes of the current nodes. In this case, operation 1608 involves determining $P_{pred}$ in the $(\theta,\varphi,r)$ space, where the predicted radius may be determined from already encoded or decoded points.

Then, at operation 1610, the residual point $P_{res,dec}$ is decoded. As this point is in spherical coordinates, it can be added to $P_{pred}$ which is also in spherical coordinates. The point $P_{dec}$ may then be computed using equation 4 at operation 1612.

$$P_{dec}=T_{sph2xyz}(P_{pred}+P_{res,dec}) \qquad (4)$$

The method then returns to operation 1602.

As will be appreciated, the encoder performs the inverse, as shown in equation 5, which shows how a residual is obtained from the original point $P_{orig}$ to be encoded by transforming $P_{orig}$ into spherical coordinates and subtracting the predicted point $P_{pred}$.

$$P_{res}=T_{sph2xyz}^{-1}(P_{orig})-P_{pred} \qquad (5)$$

Even if the coding of the residual is lossless, the transform $T_{sph2xyz}$ is likely to introduce some distortion, leading to an overall lossy scheme. However, a second residual may be introduced, as defined in equation 6.

$$P_{res,2}=P_{orig}-T_{sph2xyz}(P_{pred}+P_{res,dec}) \qquad (6)$$

$P_{res,2}$ may be coded losslessly such as to compensate for the transform distortion and the decoding becomes lossless by performing operation 1612 with equation 7.

$$P_{dec}=T_{sph2xyz}(P_{pred}-P_{res,dec})+P_{res,2,dec}=T_{sph2xyz} \\ (P_{pred}+P_{res,dec})+P_{res,2}=P_{orig} \qquad (7)$$

Specifically, if $P_{res,2}$ is encoded and decoded without loss, $P_{res,2,dec}=P_{res,2}$, and $P_{dec}=P_{orig}$. In some cases, this lossless embodiment may have better compression performance than the embodiment described in FIG. 14.

Figure 17:
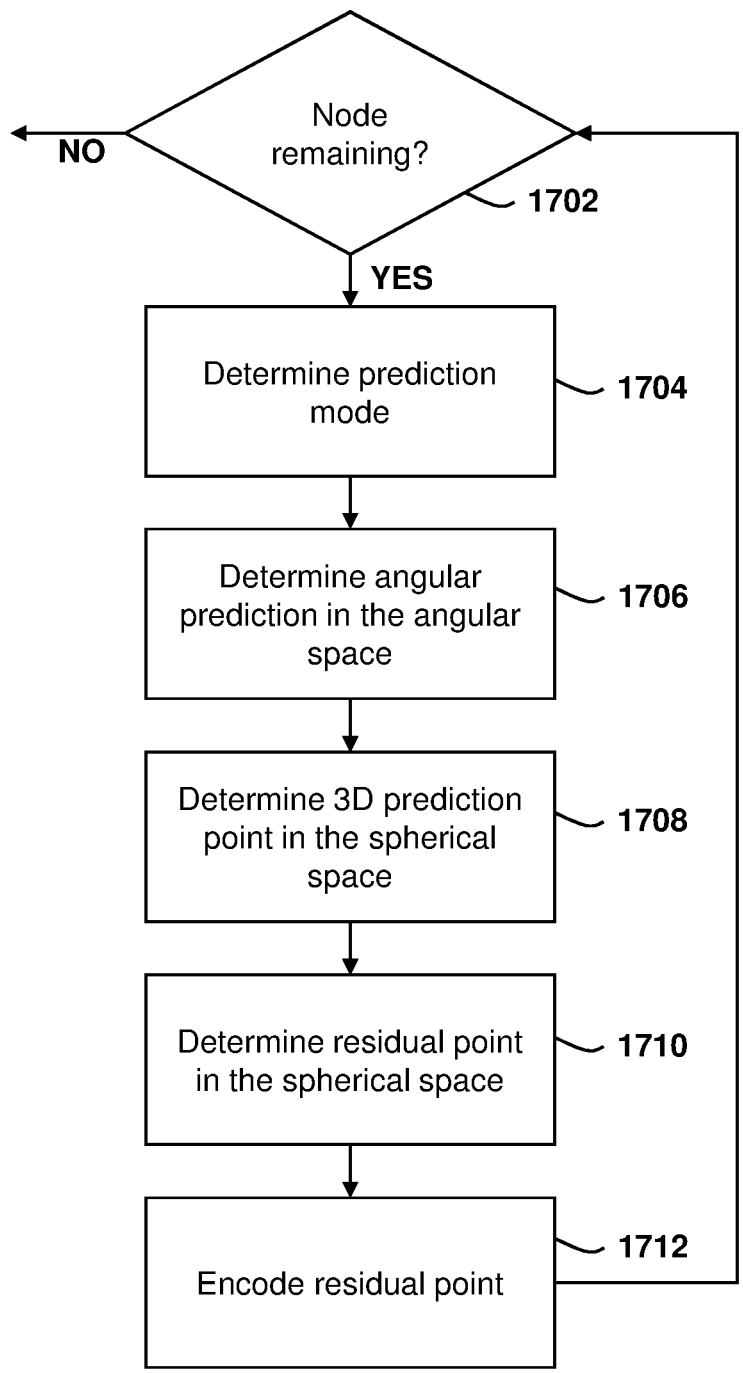
FIG. 17 shows, in flowchart form, one example method of encoding point cloud data using angular priors.

The corresponding encoding method is illustrated with respect to FIG. 17.

The method begins at operation 1702 where it is determined if there are any nodes remaining. If there are no nodes remaining, the method ends. If there are nodes remaining, the method proceeds to operation 1704 where the prediction mode is determined. The prediction mode may be an angular prediction mode, as described below, a delta prediction mode, a linear prediction mode, or other prediction modes.

When the prediction mode is the angular prediction mode, the method proceeds to operation 1706 where an angular prediction for the point is determined. The angular prediction $P_{ang}$ of $\theta$ and/or $\varphi$ is obtained by using angular priors that may comprise any of laser angles $\theta_L$, azimuthal elementary shifts $\Delta\varphi_h$, and $\Delta\varphi_v$. The prediction may also depend on already encoded points and their respective $\theta$ and $\varphi$ values.

The angular prediction $P_{ang}$ may thus be seen as a point belonging to the one-dimensional space $\theta$, the one-dimensional space $\varphi$, or the two-dimensional space $(\theta,\varphi)$.

Then, the method proceeds to operation 1708 where a three-dimension prediction point $P_{pred}$ is determined from the angular prediction $P_{ang}$. In at least some embodiments, $P_{pred}$ may be determined in part from already encoded points associated with the ancestor nodes of the current nodes. In this embodiment, $P_{pred}$ is expressed in spherical coordinates.

Then, at operation 1710, the residual point $P_{res}$ is computed by subtracting the prediction $P_{pred}$ from the point to be encoded. As $P_{pred}$ is expressed in spherical coordinates, the point to be encoded is first transformed to spherical coordinates using $T_{sph2xyz}^{-1}$. As will be appreciated $P_{res}$ is also expressed in spherical coordinates. At operation 1712, the residual point $P_{res}$ is encoded.

The method then returns to operation 1702.

In at least some embodiments, a second residual $P_{res,2}$ may be encoded as discussed above.

Determining the Angular Prediction $\theta$

The angular prediction $P_{ang}=(\theta_{ang},\varphi_{ang})$ comprises the predicted elevation angle $\theta_{ang}$ and/or the predicted azimuthal angle $\varphi_{ang}$ for the point $P_{orig}$ to be encoded or decoded.

The possible values of the predicted elevation angle $\theta_{ang}$ correspond to each possible laser elevation angle $\theta_L$ associated with the laser beam L. The angle $\theta_L$ belongs to a finite set $\{\theta_0, \ldots, \theta_{N\theta-1}\}$ of possible elevation angle values associated with the set of the LiDAR's $N_\theta$ laser beams. Typically, the values of the angles $\theta_L$ belong to $[-\pi/2,\pi/2]$ and are coded into the bitstream such that the decoder knows the configuration of the LiDAR that has acquired the point cloud.

Therefore, the elevation angle $\theta$ of the angular prediction $P_{ang}$ belongs to the finite set of laser angles $\{\theta_L\}$ and is entirely defined by the beam prediction index $L_{pred}$ such that $\theta_{ang}=\theta_{Lpred}$. The prediction index may be determined by direct coding of $L_{pred}$. While this is versatile, it is very costly in terms of bitrate.

Alternatively, $L_{pred}$ may be inferred from the parent index $L_{parent}$. For example, one may have $L_{pred}=L_{parent}+1$ until the last index is reached and then L starts again from the first index. In other words, the laser index is entirely inferred by the laser scanning order. However, this method is unable to deal with missing points (i.e., points where the LiDAR would have detected an object if an object was there) and cannot be used alone. This is the most advantageous method in terms of bitrate as it requires little to no signaling in the bitstream.

Alternatively, $L_{pred}$ may be coded with residual coding, such that $L_{pred}=L_{parent}+L_{res}$, or $L_{pred}=PL+L_{res}$, where PL is a prediction of the beam index. The residual index $L_{res}$ is then losslessly coded into the bitstream using entropy coding.

Residual coding combines both versatility, as it can code any index, and low bitrate because, when using an optimal point order to build the tree, as optimized by the encoder, the magnitude of $L_{res}$ is low, thus requiring a low number of bits to be coded.

Optimizing the order of the points constituting the predictive-point tree, such as to minimize the bitrate, is performed by the encoder through a Rate Optimization (RO) process. For example, the RO process may test all possible prediction and index coding methods, and then select the one with the least associated bitrate. Another possibility that minimizes the latency on the encoder side is to code the points in order of their acquisition.

The index residual $L_{res}$ is a signed integer belonging to the range $[-N_o+1, N_o-1]$. It may be binarized and entropy coded as follows:

1. A flag f, signaling whether or not $L_{res}$ is equal to zero is coded using a binary entropy coder with a dedicated context, such as CABAC.
2. If f is false:
2.1 A bit signaling the sign of $L_{res}$ is coded. This bit may be bypassed or coded using the binary entropy coder with a dedicated context, such as CABAC.
2.2 The magnitude $M=|L_{res}-1|$ of the index residual is coded by firstly using a binarization (e.g. unary binarization or exp-Golomb binarization), and secondly by entropy coding at least one of the obtained bits with a dedicated context, such as CABAC.

The encoder may pick points in an order such that nodes have almost always increasing (or decreasing) indices. Consequently, the residual sign is almost always the same. Entropy coding the sign of the residual helps to benefit from this specific structure, and this is particularly efficient when the encoder has coded the points in order of their acquisition.

In another variant of the encoding method, the encoder may code all points acquired by a first laser beam L1, then code all points acquired by a second laser beam L2, and so on. In this case, the residual index $L_{res}$ is almost always zero expect when changing from laser beam $L_i$ to laser beam $L_{i+1}$. Entropy coding the flag f helps to benefit from this specific structure.

According to at least one embodiment, the formula $L_{pred}=L_{parent}+L_{res}$ may be understood modulo the number $N_\theta$ of laser beams, as shown in equation 8.

$$L_{pred}=L_{parent}+L_{res}(\bmod N_\theta) \quad (8)$$

This is advantageous in case of a coding order corresponding to the order of acquisition where the laser index $L_{pred}$ is essentially equal to $L_{parent}+1$. This formula still holds modulo $N_\theta$ when the last laser is reached and $L_{pred}$ goes back to the first laser. In this case, most of residual index $L_{res}$ values are equal to 1 and are efficiently coded by the entropy coding of the flag f (false), the sign (+) and the magnitude M=0 whose first and unique bit is entropy coded.

As discussed above, $L_{parent}$ may be replaced by any prediction PL of the beam index. For example, PL may be the beam index of an ancestor other than the parent of the current node. In this case, the ancestor index may also be coded in the bitstream.

Determining the Angular Prediction φ

As discussed above, points are acquired with a regular azimuthal angle φ structure constrained by the rotation of the head of the LiDAR. The horizontal azimuthal distance Δφh between two points acquired by the same laser L is constant, up to some unavoidable acquisition noise and quantization. Also, the vertical azimuthal distance Δφh between two points probed by two adjacent lasers may be constant.

However, the LiDAR does miss points because there is no object reflecting the laser beam. Thus, practically, the relationship expressed in equation 9 essentially holds (up to noise) between the azimuthal angle φ of a current point to be encoded or decoded and the azimuthal angle $\varphi_{anc}$ of one of its ancestors.

$$\varphi_{anc}=\varphi_{anc}+k\Delta\varphi_h+\Delta\varphi(L_{anc}\to L_{current}) \quad (9)$$

In equation 9, k is an integer and $\Delta\varphi(L_{anc}\to L_{current})$ is the azimuthal distance between two consecutive points probed by the ancestor point's laser beam $L_{anc}$ and the current point's laser beam $L_{current}$. The elementary angular shifts $\Delta\varphi_h$ and $\Delta\varphi_v$ may be coded into the bitstream such that $\Delta\varphi(L_{anc}\to L_{current})$ can be deduced from the elementary angular shift $\Delta\varphi_v$ as the sum of relevant shifts. In case the elementary angular shift between two consecutive lasers is constant and equal to $\Delta\varphi_v$, the relationship expressed in equation 10 holds.

$$\Delta\varphi(L_{anc}\to L_{current})=(L_{current}-L_{anc})\Delta\varphi_v \quad (10)$$

Therefore, assuming laser indices are known, φ is essentially entirely determined by the integer k that is inferred or coded in the bitstream for each point. This integer k may be coded the same way as $L_{res}$, as shown below.

1. A flag f, signaling whether or not k is equal to zero is coded using a binary entropy coder with a dedicated context, such as CABAC.
2. If f is false:
2.1 A bit signaling the sign of k is coded. This bit may be bypassed or coded using the binary entropy coder with a dedicated context, such as CABAC.
2.2 The magnitude $M=|k-1|$ of the index residual is coded by firstly using a binarization (e.g. unary binarization or exp-Golomb binarization), and by entropy coding at least one of the obtained bits with a dedicated context, such as CABAC.

The encoder may code points in an order corresponding to the order of acquisition. In this case, φ is essentially increasing point after point and the integer k is positive. Entropy coding the sign of k helps to benefit from this specific structure. Also, in dense environments with a high probability of having the beam reflected, a point is often acquired at each probing and most of values for k are 0. Entropy coding the flag f helps to benefit from this specific structure.

The value of $\varphi_{anc}$ may be the (encoded or decoded) azimuthal angle for the point associated with the parent node, such that $\varphi_{anc}=\varphi_{parent}$. Alternatively, the value of $\varphi_{anc}$ may be the (encoded or decoded) azimuthal angle for the point associated with the grand-parent node, such that $\varphi_{anc}=\varphi_{grand-parent}$. Alternatively, the value of $\varphi_{anc}$ may be the mean of (encoded or decoded) azimuthal angles $\varphi_{anc}$ for the points associated with any subset of ancestor nodes. Before performing the mean, all angles $\varphi_{anc}$ are shifted to belong to a same angular interval of length $\Delta\varphi_h$.

In at least some embodiments, the choice of the value $\varphi_{anc}$ may be inferred by the prediction mode.

Combined Prediction for θ and φ

According to at least some embodiments, instead of coding separately each of the prediction mode index, information representing the angle $\theta_{ang}$ (e.g. $L_{res}$), and information representing the angle $\varphi_{ang}$ (e.g. k), it may be advantageous to group all this data into specific prediction modes from which all or part of this information may be inferred. By carefully selecting specific prediction modes to correspond to the most common point structures, better compression may be achieved.

For example, a prediction mode NEXT may be defined such that $L_{pred}=L_{parent}+1 \pmod{N_\theta}$ and k=+1 if $L_{parent}+1=N_\theta$, otherwise k=0. This prediction mode is particularly efficient as it requires only the prediction mode index corresponding to NEXT, to be coded. It may be used often when the order of points in the tree follows the order of acquisition.

In another example, when points are often missed during the probing, an extension of this mode, namely the prediction mode NEXT(N) may be defined such that $L_{pred}=L_{parent}$ N (mod $N_\theta$) and k=+1 if $L_{parent}+N \geq N_\theta$, otherwise k=0. In this case, only the positive integer N, together with the prediction mode index corresponding to NEXT( ) must be coded into the bitstream. The positive integer N may be coded using a unary binarization and entropy coding of the resulting bits.

In yet another example, in case horizontal structures are probed, it may be advantageous to introduce another prediction mode NEXT_PHI that may be defined such that $L_{pred}=L_{parent}$, and k=+1. This prediction mode is particularly efficient as it requires only the prediction mode index corresponding to NEXT_PHI to be coded into the bitstream.

Coding the Prediction Modes

A prediction mode may be coded at the node level and applied to the unique point associated with the node. Instead of coding directly for each node the prediction mode index, among an ordered finite set of indices, the cost of this index may be greatly reduced by using prediction mode prediction.

In at least one embodiment, the ordered finite set of acceptable prediction mode indices may be inferred from the prediction mode of the parent node. This inference applies to both the elements of the set and their order. The index is then coded using a unary binarization (following the order of the set) and entropy coding of the obtained bits. For example, if the parent node has used the prediction mode NEXT, then the first element of the ordered finite set of mode indices may correspond to NEXT. The same may apply to NEXT(N) and/or NEXT_PHI and/or any other prediction mode.

In at least another embodiment, the ordered finite set of acceptable prediction mode indices may be inferred from the prediction mode of an already encoded or decoded sibling node sharing the same parent. For example, the coding process of the tree may start with a list of the prediction modes, the list having a predefined initial order. Each time a node is encoded or decoded, the prediction mode used for the node is moved to the front of the list. In another example, the coding process may start with a list of prediction modes, each one associated with a counter initialized to zero. Each time a prediction mode is used the counter associated to that prediction mode is increased, and the list is re-ordered according to the counters so that they are in decreasing order. Thus, the prediction modes are ordered according to their frequency of use. To obtain better local adaptation, the counters may be halved regularly, for instance each time the sum of the counters reaches a threshold (e.g. 1024).

In at least another embodiment, the ordered finite set of acceptable prediction mode indices may be inferred from the prediction mode of several already encoded or decoded sibling and/or ancestor nodes, and the inference is performed following a majority voting. For example, if the parent node and one sibling node both use the mode NEXT(N), and one another sibling node uses the mode NEXT, then the inference is performed by the majority vote NEXT(N).

In at least another embodiment, a prediction mode may be coded at the parent node level and applied to the points associated with all child nodes of the parent node. By doing so, the prediction mode index is factored at the parent node level but at the cost of some prediction rigidity that may lead to larger residual $P_{res}$ to code.

The set of prediction modes may also contain prediction modes that do not use angular priors to compute the prediction point $P_{pred}$.

Determining a Predicted Point from the Angular Prediction

When a prediction mode using angular priors is selected for coding a point P, an angular prediction $P_{ang}$ is determined as described above. Then, a three-dimensional prediction point $P_{pred}$ must be deduced from $P_{ang}$ to represent the point P as the sum of $P_{pred}$ and a residual $P_{res}$.

According to at least one embodiment, the angular prediction $P_{ang}=(\theta_{ang}, \varphi_{ang})$ is combined with a radius $r_{ang}$ to obtain a three-dimensional point $P_{pred}$ with spherical coordinates $(\theta_{ang}, \varphi^{ang}, r_{ang})$. The transform $T_{sph2xyz}$ may then be used on the prediction point $P_{pred}$ to obtain a residual point $P_{res}$ in cartesian coordinates. Alternatively, the prediction point $P_{pred}$ may be used without the transform $T_{sph2xyz}$ to obtain a residual point $P_{res}$ in spherical coordinates.

The radius $r_{ang}$ may be determined from already encoded or decoded points using interpolation with the known radiuses of these points. For example, $r_{ang}$ may be taken as the radius of the point associated with the parent node, a sibling node, or the radius of the point associated with the closest ancestor node probed by the same laser as the current node. In other embodiments, $r_{ang}$ is taken as the mean radius among radiuses of points associated with sibling and ancestor nodes, the median radius among radiuses of points associated with sibling and ancestor nodes, or a linear combination of radiuses of points associated with sibling ancestor nodes.

The choice of the interpolation method may be inferred by the prediction mode itself or signaled by a dedicated syntax. In the former case, for example, one may define the prediction mode NEXT as discussed above plus an inference of the radius $r_{ang}$ to be taken as the radius of the point associated with the parent node. This inference preserves the lightweight signaling of the mode NEXT. The same inference may apply to the mode NEXT(N). Other combinations are possible.

Projecting a Cartesian Prediction on the Angular Prediction Subspace

According to at least some embodiments, a three-dimensional cartesian prediction $P_{pred,1}$ is determined, with or without angular priors, and is projected on a subspace S deduced from the angular prediction $P_{ang}$.

The first cartesian prediction $P_{pred,1}$ may be determined by any method from the prior art, such as using linear combinations of already encoded or decoded points. The subspace is determined from $P_{ang}=(\theta_{ang}, \varphi_{ang})$ as follows.

1. A first subspace $S_\theta$ is associated with the angle $\theta_{ang}$. As discussed above, this is a cone traced by the laser associated with $\theta_{ang}$ as it rotates around the LiDAR head.
2. A second subspace $S_\varphi$ is associated with the angle $\varphi_{ang}$. This is the vertical half-plane associated with all possible points having azimuthal angle $\varphi_{ang}$.

The subspace S is the intersection of $S_\theta$ and $S_\varphi$. In this case S is a half-line corresponding to a virtual laser beam.

One advantage of the projection approach is its capability to deal with partial one-dimensional angular prediction $P_{ang}=(\theta_{ang})$ or $P_{ang}=(\varphi_{ang})$ where only one of the two angular priors can be used. In case the prediction determines only $\theta_{ang}$, then the subspace S is equal to $S_\theta$. In case the prediction determines only $\varphi_{ang}$, then the subspace S is equal to $S_\varphi$.

The operation 7E of projection may be the exact mathematical definition of a projector in a Euclidian space: $P_{pred}$ is the closest point of S from $P_{pred,1}$.

Alternatively, the projection operation 7E may first transform $P_{pred,1}$ into spherical coordinates ($\theta_{pred,1}$, $\varphi_{pred,1}$, $r_{pred,1}$), then substitute $\theta_{ang}$ and/or $\varphi_{ang}$ to $\theta_{pred,1}$ and/or $\varphi_{pred,1}$ to obtain $P_{pred}$, and transform $P_{pred}$ back to cartesian coordinates.

The choice of the projection method may be inferred by the prediction mode itself or signaled by a dedicated syntax.

Exemplary Encoder and Decoder

Figure 18:
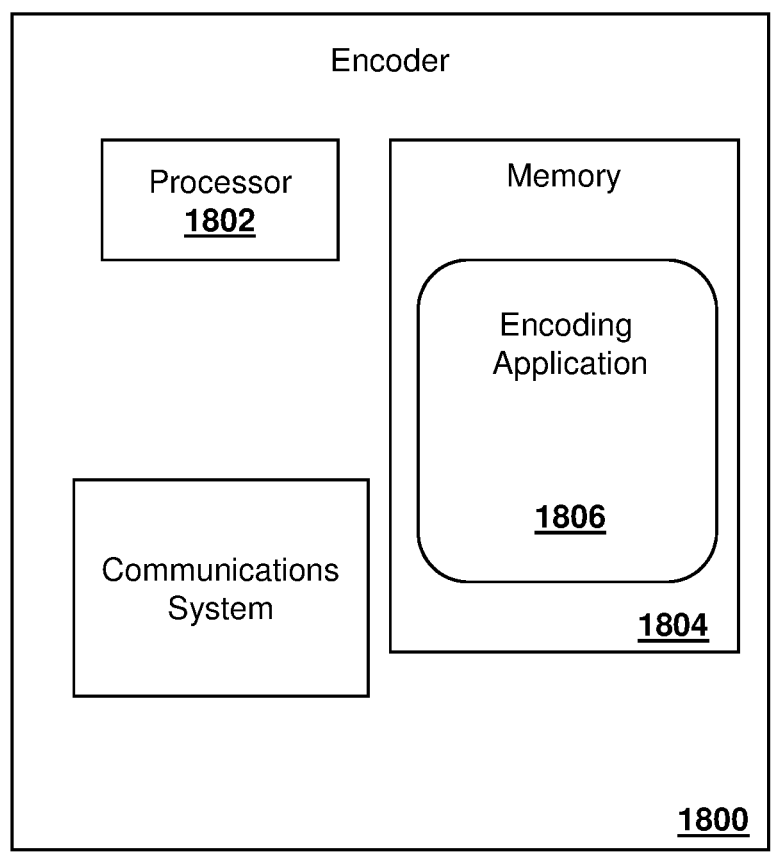
FIG. 18 shows an example simplified block diagram of an encoder.

Reference is now made to FIG. 18, which shows a simplified block diagram of an example embodiment of an encoder 1800. The encoder 1800 includes a processor 1802, memory 1804, and an encoding application 1806. The encoding application 1806 may include a computer program or application stored in memory 1804 and containing instructions that, when executed, cause the processor 1802 to perform operations such as those described herein. For example, the encoding application 1806 may encode and output bitstreams encoded in accordance with the processes described herein. It will be understood that the encoding application 1806 may be stored on a non-transitory computer-readable medium, such as a compact disc, flash memory device, random access memory, hard drive, etc. When the instructions are executed, the processor 1802 carries out the operations and functions specified in the instructions so as to operate as a special-purpose processor that implements the described process(es). Such a processor may be referred to as a "processor circuit" or "processor circuitry" in some examples.

Figure 19:
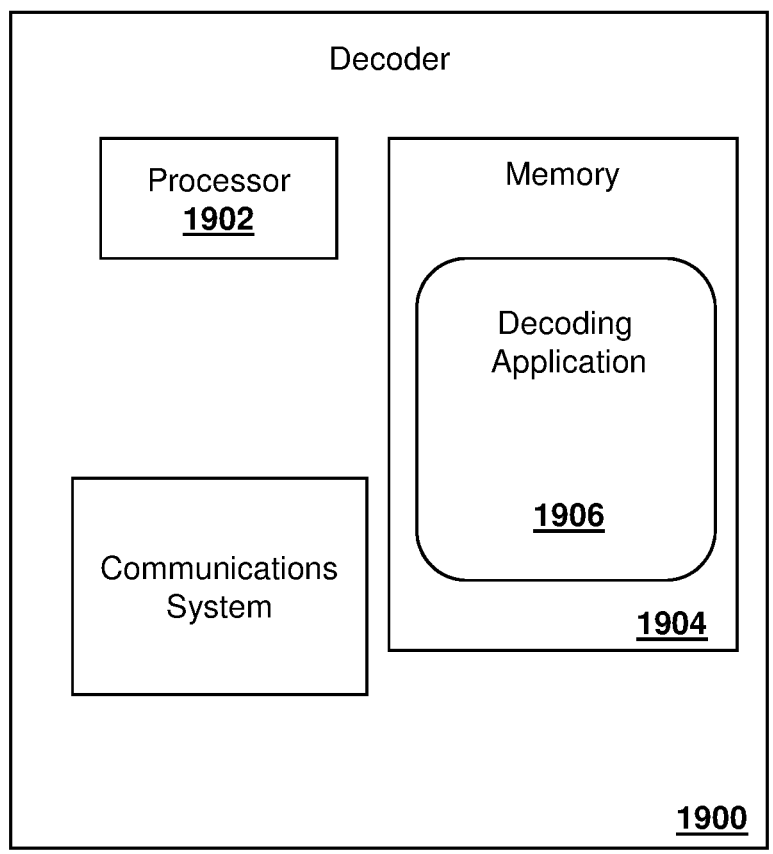
FIG. 19 shows an example simplified block diagram of a decoder.

Reference is now also made to FIG. 19, which shows a simplified block diagram of an example embodiment of a decoder 1900. The decoder 1900 includes a processor 1902, a memory 1904, and a decoding application 1906. The decoding application 1906 may include a computer program or application stored in memory 1904 and containing instructions that, when executed, cause the processor 1902 to perform operations such as those described herein. It will be understood that the decoding application 1906 may be stored on a computer-readable medium, such as a compact disc, flash memory device, random access memory, hard drive, etc. When the instructions are executed, the processor 1902 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

The invention claimed is:

1. A method of decoding a bitstream of compressed point cloud data representing a three-dimensional location of an object, the point cloud being represented by a predictive-point tree, for generating a point cloud data, the method comprising:
   a) determining at least one of an elevation angle and an azimuthal angle associated with a point of a current node of the tree;
   b) determining a prediction point from the at least one angle;
   c) decoding a residual point from the bitstream; and
   d) computing a point for the point cloud data by adding the residual point to the prediction point.

2. The method of claim 1, wherein determining the prediction point further comprises computing a prediction radius.

3. The method of claim 2, wherein the prediction radius is determined by a linear combination of radiuses associated with at least one ancestor node of the current node and one sibling node of the current node.

4. The method of claim 1, wherein step b) further comprises converting the prediction point to cartesian coordinates.

5. The method of claim 1, further comprising decoding a second residual from the bitstream and wherein the step d) of computing the point for the point cloud data further comprises adding the second residual to a sum of the residual point and the prediction point transformed from spherical coordinates to cartesian coordinates.

6. The method of claim 1, wherein determining the prediction point comprises:
   determining a first prediction point by a linear combination of points associated with at least one of an ancestor node of the current node and a sibling node of the current node;
   projecting the first prediction point on a subspace determined from the at least one angle.

7. The method of claim 6, wherein the subspace is an intersection of a cone associated with the elevation angle and a half-plane associated with the azimuthal angle.

8. The method of claim 1, wherein determining the elevation angle comprises mapping a beam emitter index to the elevation angle.

9. The method of claim 2, wherein determining the azimuthal angle comprises:
   determining a first azimuthal angle associated to an ancestor node;
   adding $k\Delta\varphi_h + \Delta\varphi(L_{anc} \rightarrow L_{current})$ to the first azimuthal angle;
wherein k is an integer, $\Delta\varphi_h$ is an elementary horizontal shift for azimuthal angle, and $\Delta\varphi(L_{anc} \rightarrow L_{current})$ is an azimuthal distance between two consecutive points probed respectively by a laser beam $L_{anc}$ associated with the ancestor point and a laser beam $L_{current}$ associated with the current point.

10. A decoder for decoding a bitstream of compressed point cloud data to produce a reconstructed point cloud representing a three-dimensional location of a physical object, the decoder comprising:
- a processor;
- a memory; and
- a decoding application containing instructions executable by the processor that, when executed, cause the processor to:
  a) determine at least one of an elevation angle and an azimuthal angle associated with a point of a current node of the tree;
  b) determine a prediction point from the at least one angle;
  c) decode a residual point from the bitstream; and
  d) compute a point for the point cloud data by adding the residual point to the prediction point.

11. A non-transitory processor-readable medium storing processor-executable instructions that, when executed by a processor, cause the processor to:
  a) determine at least one of an elevation angle and an azimuthal angle associated with a point of a current node of the tree;
  b) determine a prediction point from the at least one angle;
  c) decode a residual point from the bitstream; and
  d) compute a point for the point cloud data by adding the residual point to the prediction point.

12. The decoder of claim 10, wherein the processor is caused to determine the prediction point by computing a prediction radius.

13. The decoder of claim 12, wherein the prediction radius is determined by a linear combination of radiuses associated with at least one ancestor node of the current node and one sibling node of the current node.

14. The decoder of claim 10, wherein the processor is caused to determine the prediction point from the at least one angle by converting the prediction point to cartesian coordinates.

15. The decoder of claim 10, wherein the processor is further caused to decode a second residual from the bitstream and wherein the processor is further caused to compute the point for the point cloud data by adding the second residual to a sum of the residual point and the prediction point transformed from spherical coordinates to cartesian coordinates.

16. The decoder of claim 10, wherein the processor is caused to determine the prediction point by:
- determining a first prediction point by a linear combination of points associated with at least one of an ancestor node of the current node and a sibling node of the current node;
- projecting the first prediction point on a subspace determined from the at least one angle.

17. The decoder of claim 16, wherein the subspace is an intersection of a cone associated with the elevation angle and a half-plane associated with the azimuthal angle.

18. The decoder of claim 10, wherein the processor is caused to determine the elevation angle by mapping a beam emitter index to the elevation angle.

19. The decoder of claim 12, wherein the processor is caused to determine the azimuthal angle by:
- determining a first azimuthal angle associated to an ancestor node;
- adding $k\Delta\varphi_h + \Delta\varphi(L_{anc} \to L_{current})$ to the first azimuthal angle;
- wherein k is an integer, $\Delta\varphi_h$ is an elementary horizontal shift for azimuthal angle, and $\Delta\varphi(L_{anc} \to L_{current})$ is an azimuthal distance between two consecutive points probed respectively by a laser beam $L_{anc}$ associated with the ancestor point and a laser beam $L_{current}$ associated with the current point.

* * * * *